(12) United States Patent
Tanaka et al.

(10) Patent No.: US 9,459,542 B2
(45) Date of Patent: Oct. 4, 2016

(54) ELECTROPHOTOGRAPHIC PHOTOSENSITIVE MEMBER, PROCESS CARTRIDGE, ELECTROPHOTOGRAPHIC APPARATUS, AND GALLIUM PHTHALOCYANINE CRYSTAL

(71) Applicant: CANON KABUSHIKI KAISHA, Tokyo (JP)

(72) Inventors: Masato Tanaka, Tagata-gun (JP); Masataka Kawahara, Mishima (JP); Kaname Watariguchi, Mishima (JP); Takeshi Murakami, Numazu (JP); Akira Yoshida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/356,576

(22) PCT Filed: Nov. 29, 2012

(86) PCT No.: PCT/JP2012/081584
§ 371 (c)(1),
(2) Date: May 6, 2014

(87) PCT Pub. No.: WO2013/081178
PCT Pub. Date: Jun. 6, 2013

(65) Prior Publication Data
US 2014/0308606 A1    Oct. 16, 2014

(30) Foreign Application Priority Data

Nov. 30, 2011 (JP) .................................. 2011-262020
Nov. 6, 2012 (JP) .................................. 2012-244468

(51) Int. Cl.
*G03G 5/047* (2006.01)
*G03G 5/06* (2006.01)
(Continued)

(52) U.S. Cl.
CPC ......... *G03G 5/0614* (2013.01); *C09B 67/0026* (2013.01); *G03G 5/00* (2013.01); *G03G 5/0609* (2013.01); *G03G 5/0618* (2013.01); *G03G 5/0696* (2013.01); *G03G 21/18* (2013.01)

(58) Field of Classification Search
CPC ............................ G03G 5/047; G03G 5/0696
See application file for complete search history.

(56) References Cited

U.S. PATENT DOCUMENTS 3,387,973 A    6/1968 Fox et al.
4,042,388 A    8/1977 Inoue et al.
(Continued)

FOREIGN PATENT DOCUMENTS

EP    1 006 414 A1    6/2000
EP    1 721 940 A2    11/2006
(Continued)

OTHER PUBLICATIONS

European Search Report dated Jul. 14, 2015 in European Application No. 12852976.5.
(Continued)

*Primary Examiner* — Hoa V Le
(74) *Attorney, Agent, or Firm* — Fitzpatrick, Cella, Harper & Scinto

(57) ABSTRACT

Provided is an electrophotographic photosensitive member, a process cartridge and an electrophotographic apparatus each having the electrophotographic photosensitive member that can output an image having less image defects due to a ghost phenomenon not only under a normal-temperature, normal-humidity environment but also under a low-temperature, low-humidity environment as a particularly severe condition. The electrophotographic photosensitive member includes a support and a photosensitive layer formed on the support, in which the photosensitive layer includes a gallium phthalocyanine crystal containing a specific amine compound in itself.

9 Claims, 8 Drawing Sheets

(51) Int. Cl.
*G03G 5/00* (2006.01)
*G03G 21/18* (2006.01)
*C09B 67/50* (2006.01)

(56) References Cited

U.S. PATENT DOCUMENTS

| | | | |
|---|---|---|---|
| 5,393,627 | A | 2/1995 | Nakamura et al. |
| 5,705,304 | A | 1/1998 | Sugita et al. |
| 6,391,505 | B1 | 5/2002 | Hamasaki et al. |
| 6,472,524 | B2 | 10/2002 | Tanaka |
| 8,415,078 | B2 * | 4/2013 | Tanaka ............... G03G 5/0614 399/159 |
| 8,518,615 | B2 | 8/2013 | Tanaka |
| 2006/0198659 | A1 | 9/2006 | Niimi |
| 2009/0004584 | A1 | 1/2009 | Wu |
| 2009/0061340 | A1 | 3/2009 | Lin et al. |
| 2009/0136861 | A1 | 5/2009 | Mitsumori et al. |
| 2011/0076614 | A1 * | 3/2011 | Tanaka ................ C09B 23/04 430/270.1 |
| 2012/0003576 | A1 * | 1/2012 | Tanaka ............... G03G 5/0614 430/56 |
| 2013/0137023 | A1 | 5/2013 | Wataraguchi et al. |
| 2013/0137025 | A1 | 5/2013 | Kawahara et al. |
| 2013/0137032 | A1 | 5/2013 | Tanaka et al. |
| 2014/0141362 | A1 | 5/2014 | Wataraguchi et al. |
| 2014/0170540 | A1 | 6/2014 | Tanaka |
| 2014/0170541 | A1 | 6/2014 | Tanaka |

FOREIGN PATENT DOCUMENTS

| | | |
|---|---|---|
| EP | 1 734 084 A1 | 12/2006 |
| EP | 1 887 047 A1 | 2/2008 |
| EP | 2 402 819 A1 | 1/2012 |
| JP | 02-097954 A | 4/1990 |
| JP | 4-254862 A | 9/1992 |
| JP | 5-224439 A | 9/1993 |
| JP | 6-211758 A | 8/1994 |
| JP | 6-273953 A | 9/1994 |
| JP | 8-184980 A | 7/1996 |
| JP | 11-172143 A | 6/1999 |
| JP | 2001-40237 A | 2/2001 |
| JP | 2006-72304 A | 3/2006 |
| JP | 2006-072304 A | 3/2006 |
| JP | 2011-94101 A | 5/2011 |
| JP | 2012-32781 A | 2/2012 |

OTHER PUBLICATIONS

International Search Report and Written Opinion of the International Searching Authority, International Application No. PCT/JP2012/081584, Mailing Date Mar. 12, 2013.

European Search Report dated Dec. 3, 2015 in European Application No. 12852976.5.

* cited by examiner

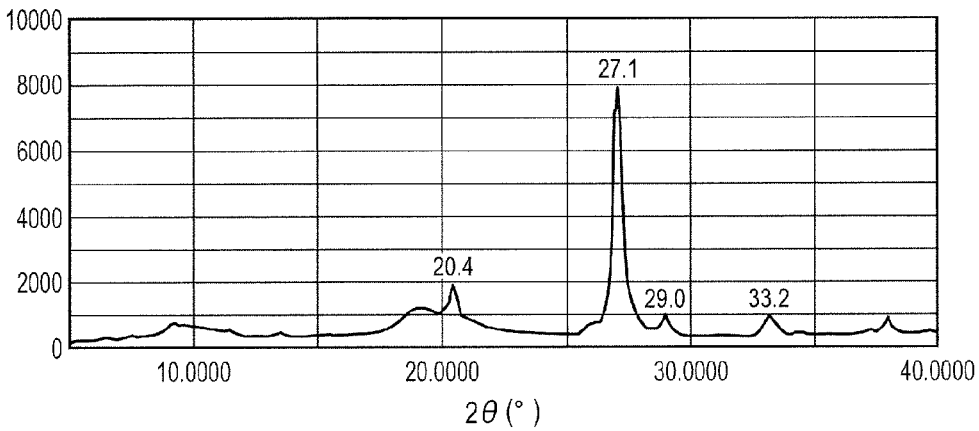
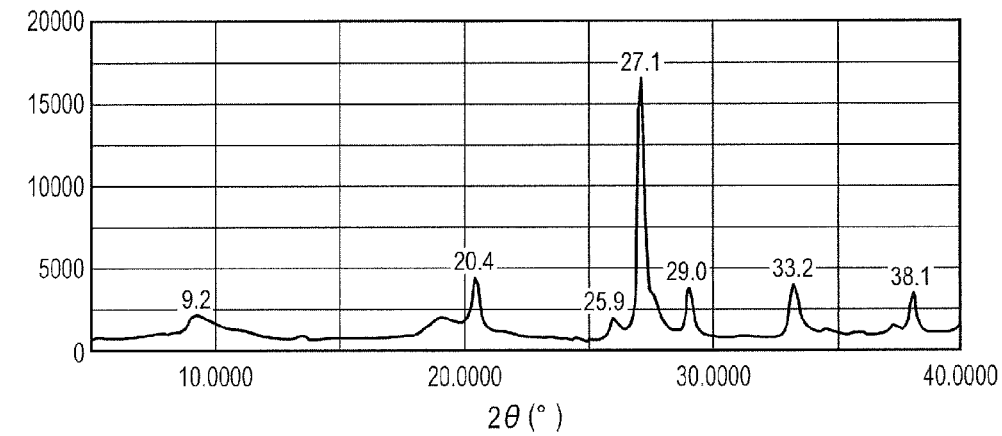
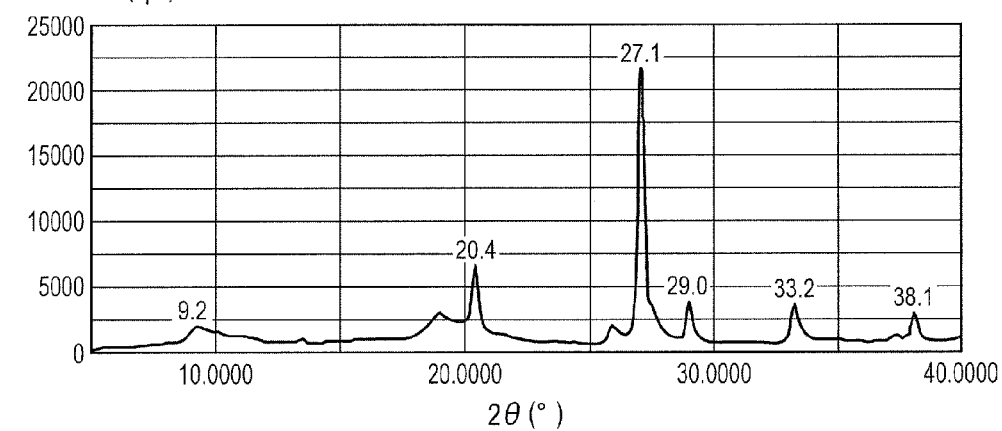

ELECTROPHOTOGRAPHIC PHOTOSENSITIVE MEMBER, PROCESS CARTRIDGE, ELECTROPHOTOGRAPHIC APPARATUS, AND GALLIUM PHTHALOCYANINE CRYSTAL

TECHNICAL FIELD

The present invention relates to an electrophotographic photosensitive member, a process cartridge and an electrophotographic apparatus each having the electrophotographic photosensitive member, and a gallium phthalocyanine crystal.

BACKGROUND ART

An oscillation wavelength of semiconductor laser, which has been frequently used as an image exposing unit is, at present, a long wavelength such as 650 to 820 nm. Accordingly, development of an electrophotographic photosensitive member having high sensitivity to light having such a long wavelength has been advanced.

A phthalocyanine pigment is effective as a charge-generating substance having high sensitivity to light having a wavelength in such a long-wavelength region. In particular, oxytitanium phthalocyanine and gallium phthalocyanine have excellent sensitivity characteristics, and various crystal forms thereof have been reported heretofore.

An electrophotographic photosensitive member using the phthalocyanine pigment has an excellent sensitivity characteristic. However, the electrophotographic photosensitive member involves the following problem. A produced photocarrier is liable to remain on the photosensitive layer of the electrophotographic photosensitive member and is liable to serve as a kind of memory to cause an electric potential variation such as a ghost phenomenon.

Patent Literature 1 reports that addition of a specific organic electron acceptor at the time of an acid pasting process for the phthalocyanine pigment exerts a sensitizing effect. However, the approach involves the following concern and problem. The additive may chemically change, thereby being difficult to transform the additive into a desired crystal form.

In addition, Patent Literature 2 reports the following. When the pigment and a specific organic electron acceptor are subjected to a wet pulverization treatment, the organic electron acceptor is incorporated in a surface of the crystal simultaneously with crystal transformation, and hence the electrophotographic characteristics are improved.

However, the phthalocyanine crystal obtained by the approach does not contain the organic electron acceptor in itself, and the acceptor is merely in a state of being mixed with the crystal or merely adheres to its surface. Accordingly, the approach is identical in constitution and effect to the so-called addition at the time of dispersion in which a specific organic electron acceptor is added at the time of production of a coating liquid for a charge-generating layer.

In addition, Patent Literature 3 discloses that a benzophenone compound is used in an electrophotographic photosensitive member. The literature describes that use of the benzophenone compound exerts a preventing effect on photooxidation of a charge-generating substance and a suppressing effect on an increase in residual potential.

However, none of Patent Literatures 1 to 3 discloses a benzophenone compound substituted with an amino group.

CITATION LIST

Patent Literature

PTL 1: Japanese patent Application Laid-Open No. 2001-40237

PTL 2: Japanese patent Application Laid-Open No. 2006-72304

PTL 3: Japanese patent Application Laid-Open No. H06-273953

SUMMARY OF INVENTION

Technical Problem

As described above, various improvements have been attempted for an electrophotographic photosensitive member.

However, the alleviation of the deterioration of image quality due to a ghost phenomenon under various environments has been desired in association with an additional improvement in image quality in recent years.

In view of the foregoing, the present invention is directed to providing an electrophotographic photosensitive member, and a process cartridge and an electrophotographic apparatus each having the electrophotographic photosensitive member that have solved the problems and can output an image having less image defects due to the ghost phenomenon not only under a normal-temperature, normal-humidity environment but also under a low-temperature, low-humidity environment as a particularly severe condition.

Further, the present invention is directed to providing a gallium phthalocyanine crystal containing a specific amine compound in itself.

Solution to Problem

The present invention provides an electrophotographic photosensitive member, including a support and a photosensitive layer formed on the support, in which the photosensitive layer includes a gallium phthalocyanine crystal containing an amine compound represented by the following formula (1) in itself:

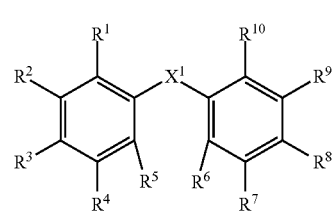

(1)

in the formula (1): $R^1$ to $R^{10}$ each independently represent one of a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, and a substituted or unsubstituted cyclic amino group, provided that at least one of $R^1$ to $R^{10}$ represents one of an amino group substituted with a substituted or unsubstituted aryl group, an amino group substituted with a substituted or unsubstituted alkyl group, and a substituted or unsubstituted cyclic amino group; and $X^1$ represents one of a carbonyl group and a dicarbonyl group.

The present invention also provides a process cartridge, including: the above-described electrophotographic photosensitive member; and at least one unit selected from the group consisting of a charging unit for charging a surface of the electrophotographic photosensitive member, a developing unit for developing an electrostatic latent image formed on the surface of the electrophotographic photosensitive member with toner to form a toner image, and a cleaning unit for removing the toner on the surface of the electrophotographic photosensitive member after transfer of the toner image onto a transfer material, the electrophotographic photosensitive member and the at least one unit being integrally supported, in which the process cartridge is detachably mountable to a main body of an electrophotographic apparatus.

The present invention also provides an electrophotographic apparatus, including: the above-described electrophotographic photosensitive member; a charging unit for charging a surface of the electrophotographic photosensitive member; an image exposing unit for irradiating the charged surface of the electrophotographic photosensitive member with image exposure light to form an electrostatic latent image; a developing unit for developing the electrostatic latent image formed on the surface of the electrophotographic photosensitive member with toner to form a toner image; and a transferring unit for transferring the toner image formed on the surface of the electrophotographic photosensitive member onto a transfer material.

The present invention also provides a gallium phthalocyanine crystal, including an amine compound represented by the following formula (1) in itself.

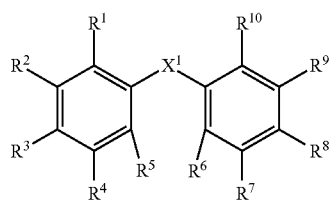

(1)

The present invention also provides a hydroxygallium phthalocyanine crystal, including peaks at Bragg angles 2θ±0.2° of 7.4°, 27.4°, and 28.3° in CuKα X-ray diffraction.

The present invention also provides a hydroxygallium phthalocyanine crystal, including peaks at Bragg angles 2θ±0.2° of 7.4°, 16.6°, 21.8°, 25.5°, and 28.3° in CuKα X-ray diffraction.

The present invention also provides a hydroxygallium phthalocyanine crystal, including peaks at Bragg angles 2θ±0.2° of 7.4°, 16.6°, 21.8°, 25.5°, 27.0°, and 28.3° in CuKα X-ray diffraction.

The present invention also provides a bromogallium phthalocyanine crystal, including peaks at Bragg angles 2θ±0.2° of 7.4°, 27.1°, and 28.4° in CuKα X-ray diffraction.

The present invention also provides an iodogallium phthalocyanine crystal, including peaks at Bragg angles 2θ±0.2° of 20.4°, 27.1°, 29.0°, and 33.2° in CuKα X-ray diffraction.

Advantageous Effects of Invention

According to the present invention, there is provided the electrophotographic photosensitive member, and the process cartridge and the electrophotographic apparatus each having the electrophotographic photosensitive member that can output an image having less image defects due to the ghost phenomenon not only under a normal-temperature, normal-humidity environment but also under a low-temperature, low-humidity environment as a particularly severe condition.

Further, according to the present invention, provided is the gallium phthalocyanine crystal having excellent characteristics as a charge-generating substance.

Further features of the present invention will become apparent from the following description of exemplary embodiments with reference to the attached drawings.

BRIEF DESCRIPTION OF DRAWINGS

FIG. 7A is a powder X-ray diffraction pattern of an iodogallium phthalocyanine crystal obtained in Example 1-16.

FIG. 7B is a powder X-ray diffraction pattern of an iodogallium phthalocyanine crystal obtained in Example 1-17.

FIG. 7C is a powder X-ray diffraction pattern of an iodogallium phthalocyanine crystal obtained in Example 1-18.

DESCRIPTION OF EMBODIMENTS

Figure 1:
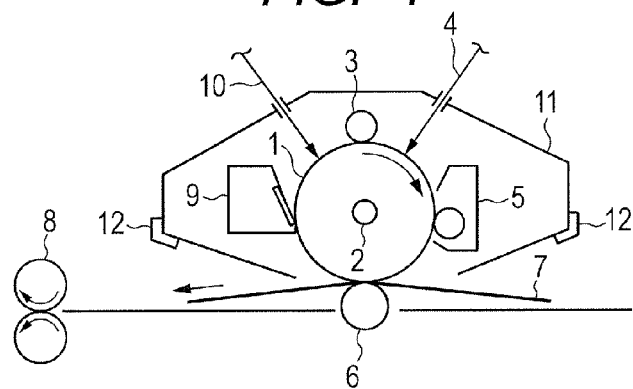
FIG. 1 is a view illustrating an example of the schematic configuration of an electrophotographic apparatus provided with a process cartridge having an electrophotographic photosensitive member of the present invention.

As described above, an electrophotographic photosensitive member of present invention is an electrophotographic photosensitive member, including a support and a photosensitive layer formed on the support, in which the photosensitive layer includes a gallium phthalocyanine crystal containing an amine compound represented by the following formula (1) in itself:

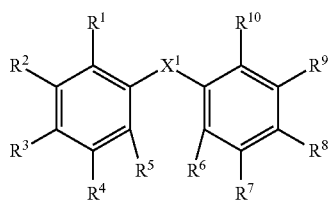
(1)

in the formula (1): $R^1$ to $R^{10}$ each independently represent one of a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, and a substituted or unsubstituted cyclic amino group, provided that at least one of $R^1$ to $R^{10}$ represents one of an amino group substituted with a substituted or unsubstituted aryl group, an amino group substituted with a substituted or unsubstituted alkyl group, and a substituted or unsubstituted cyclic amino group; and $X^1$ represents one of a carbonyl group and a dicarbonyl group.

In addition, at least one of $R^1$ to $R^{10}$ in the formula (1) preferably represents an amino group substituted with a substituted or unsubstituted alkyl group. Of such groups, it is more preferred that the substituted or unsubstituted alkyl group in the amino group substituted with the substituted or unsubstituted alkyl group be an alkyl group substituted with an alkoxy group, an alkyl group substituted with an aryl group, or an unsubstituted alkyl group.

Further, at least one of $R^1$ to $R^{10}$ in the formula (1) preferably represents a dialkylamino group. Of such groups, a dimethylamino group or a diethylamino group is more preferred.

In addition, at least one of $R^1$ to $R^{10}$ in the formula (1) preferably represents a substituted or unsubstituted cyclic amino group. Of such groups, a morpholino group or a 1-piperidino group is more preferred.

Further, the amine compound particularly preferred in terms of a suppressing effect on an image defect due to a ghost phenomenon is an amine compound represented by the following formula (2):

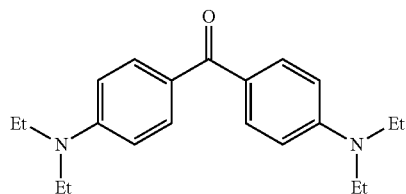
(2)

in the formula (2), Et represents an ethyl group. In addition, examples of the substituent which the substituted or unsubstituted acyl group, the substituted or unsubstituted alkyl group, the substituted or unsubstituted alkoxy group, the substituted or unsubstituted aryloxy group, the substituted or unsubstituted amino group, the substituted or unsubstituted aryl group, and the substituted or unsubstituted cyclic amino group in the formula (1) may each have include: alkyl groups such as a methyl group, an ethyl group, a propyl group, and a butyl group; alkoxy groups such as a methoxy group and an ethoxy group; dialkylamino groups such as a dimethylamino group and a diethylamino group; alkoxycarbonyl groups such as a methoxycarbonyl group and an ethoxycarbonyl group; aryl groups such as a phenyl group, a naphthyl group, and a biphenylyl group; halogen atoms such as a fluorine atom, a chlorine atom, and a bromine atom; a nitro group; a cyano group; and a halomethyl group. Of those, an aryl group or an alkoxy group is a preferred substituent.

Hereinafter, a preferred specific example (Exemplified Compound) of an amine compound contained in a gallium phthalocyanine crystal of the present invention is described, however, the present invention is not limited thereto.

Exemplified Compound

Exemplified Compound (1)

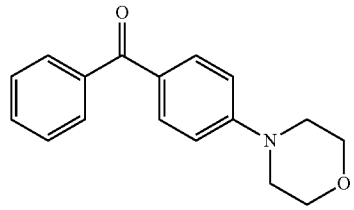

Exemplified Compound (2)

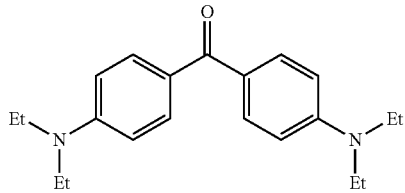

Exemplified Compound (3)

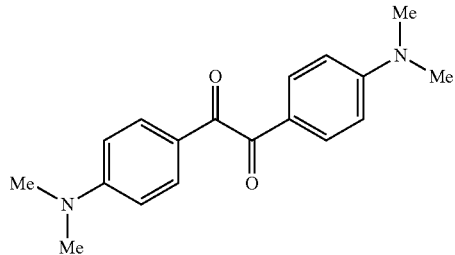

Exemplified Compound (4)
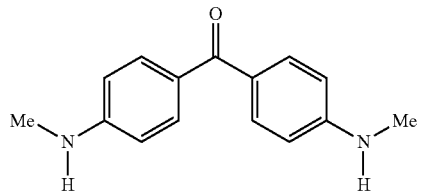
Exemplified Compound (5)
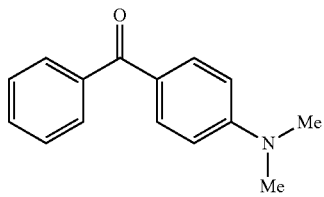
Exemplified Compound (6)
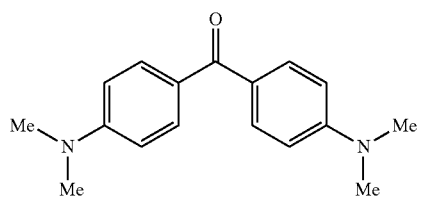
Exemplified Compound (7)
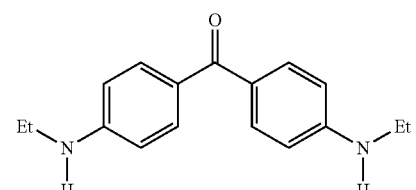
Exemplified Compound (8)
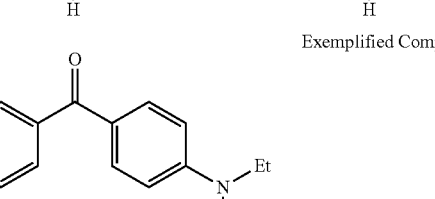
Exemplified Compound (9)
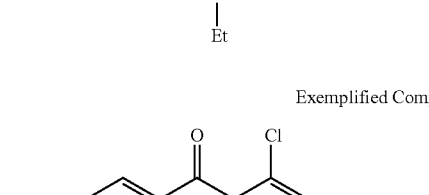
Exemplified Compound (10)
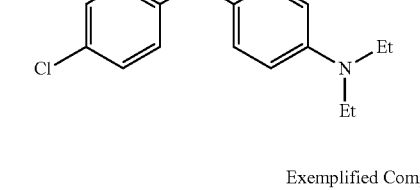
Exemplified Compound (11)
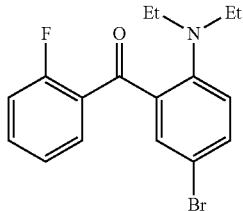
Exemplified Compound (12)
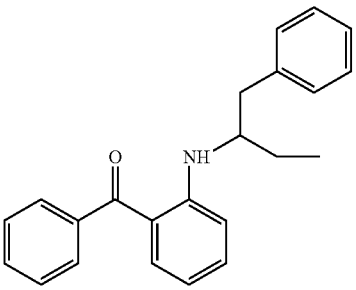
Exemplified Compound (13)
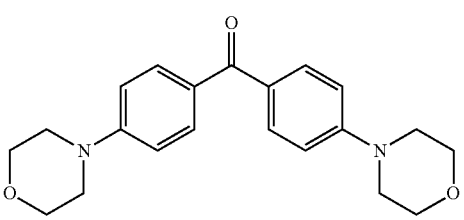
Exemplified Compound (14)
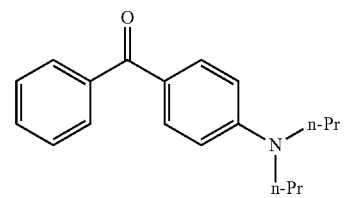
Exemplified Compound (15)
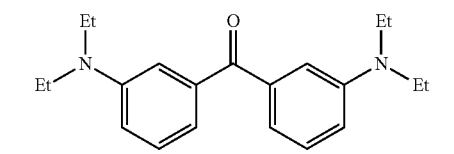
Exemplified Compound (16)
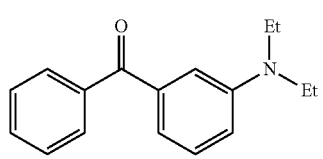
Exemplified Compound (17)
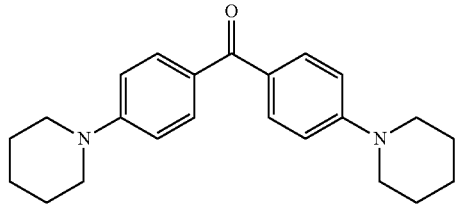

Exemplified Compound (18)

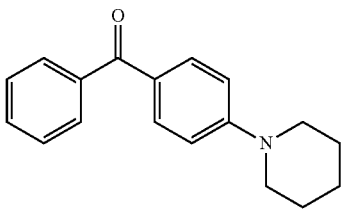

Exemplified Compound (19)

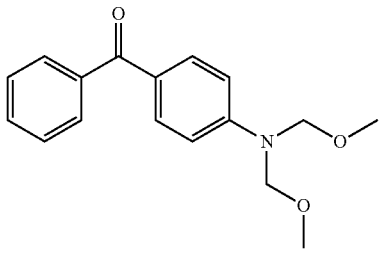

Exemplified Compound (20)

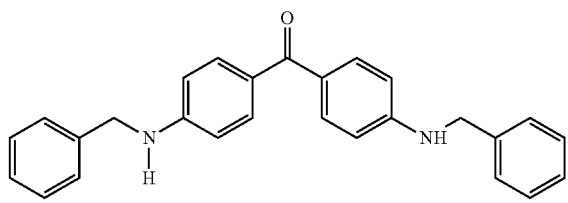

Exemplified Compound (21)

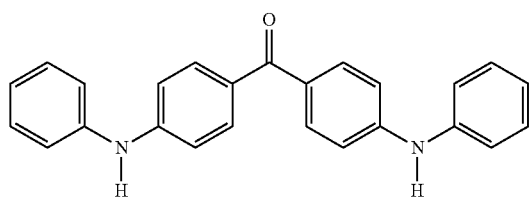

Exemplified Compound (22)

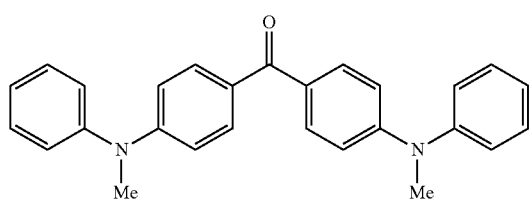

Exemplified Compound (23)

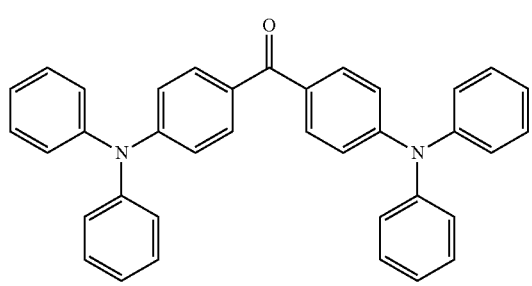

Exemplified Compound (24)

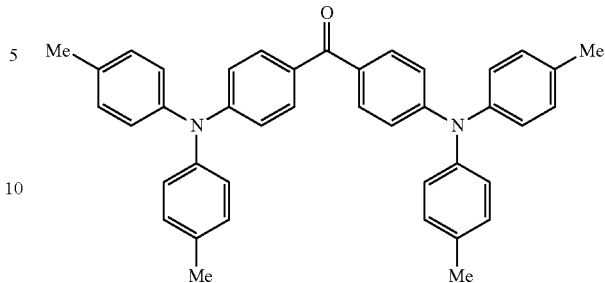

In the exemplified compounds, Me represents a methyl group, Et represents an ethyl group, and n-Pr represents a propyl group (n-propyl group).

An example of a method of synthesizing the amine compound to be used in the present invention, which is available as a commercial product, is described below.

Aminobenzophenone is used as a raw material, and a substituent can be introduced to an amino group by a substitution reaction between aminobenzophenone and a halide. Of such reactions, a reaction between aminobenzophenone and an aromatic halide using a metal catalyst is a method useful for the synthesis of an aryl group-substituted amine compound. In addition, a reaction using reductive amination is a method useful for the synthesis of an alkyl group-substituted amine compound.

Hereinafter, a specific synthetic example of Exemplified Compound (24) is shown.

The term "part(s)" shown below means "part(s) by mass."

In addition, an infrared (IR) absorption spectrum was measured with a Fourier transform infrared spectrophotometer (trade name: FT/IR-420, manufactured by JASCO Corporation). Further, a nuclear magnetic resonance (NMR) spectrum was measured with a nuclear magnetic resonance apparatus (trade name: EX-400, manufactured by JEOL RESONANCE Inc.).

Synthesis Example

Synthesis of Exemplified Compound (24)

5.0 Parts of 4,4'-diaminobenzophenone, 25.7 parts of iodotoluene, 9.0 parts of copper powder, and 9.8 parts of potassium carbonate were added to a three-necked flask containing 50 parts of N,N-dimethylacetamide, and then the mixture was refluxed for 20 hours. After that, a solid component was removed by hot filtration. The solvent was removed by distillation under reduced pressure and then the residue was purified with a silica gel column (using toluene as a solvent). Thus, 8.1 parts of Exemplified Compound (24) were obtained.

Characteristic peaks of an IR absorption spectrum and a $^1$H-NMR spectrum obtained by measurement are described below.

IR (cm$^{-1}$, KBr): 1646, 1594, 1508, 1318, 1277, and 1174

$^1$H-NMR (ppm, CDCl$_3$, 40° C.): δ=7.63 (d, 4H), 7.11 (d, 8H), 7.04 (d, 8H), 6.93 (d, 4H), and 2.33 (s, 12H)

Examples of the gallium phthalocyanine constituting the gallium phthalocyanine crystal containing the amine compound represented by the formula (1) in itself of the present invention include a gallium phthalocyanine having a halogen atom, a hydroxy group, or an alkoxy group as an axial ligand at a gallium atom in a molecule thereof. A gallium phthalocyanine may have a substituent such as a halogen atom in its phthalocyanine ring.

Of such gallium phthalocyanine crystals, hydroxygallium phthalocyanine crystals (in which a gallium atom has a hydroxy group as an axial ligand), bromogallium phthalocyanine crystals (in which a gallium atom has a bromine atom as an axial ligand), or iodogallium phthalocyanine crystals (in which a gallium atom has an iodine atom as an axial ligand) each having excellent sensitivity are preferred because the present invention effectively acts.

Further, of such gallium phthalocyanine crystals, the following crystals are preferred:
a hydroxygallium phthalocyanine crystal having peaks at Bragg angles $2\theta \pm 0.2°$ of $7.4°$, $27.4°$, and $28.3°$ in CuKα X-ray diffraction;
a hydroxygallium phthalocyanine crystal having peaks at Bragg angles $2\theta \pm 0.2°$ of $7.4°$, $16.6°$, $21.8°$, $25.5°$, and $28.3°$ in CuKα X-ray diffraction;
a bromogallium phthalocyanine crystal having peaks at Bragg angles $2\theta \pm 0.2°$ of $7.4°$, $27.1°$, and $28.4°$ in CuKα X-ray diffraction; and
an iodogallium phthalocyanine crystal having peaks at Bragg angles $2\theta \pm 0.2°$ of $20.4°$, $27.1°$, $29.0°$, and $33.2°$ in CuKα X-ray diffraction.

Of such gallium phthalocyanine crystals each having peaks at Bragg angles $2\theta \pm 0.2°$ of $7.4°$, $27.4°$, and $28.3°$ in CuKα X-ray diffraction, such a hydroxygallium phthalocyanine crystal that a peak intensity at $27.4°$ is 5% or more and 100% or less with respect to a peak intensity at $7.4°$ is particularly preferred in terms of a suppressing effect on an image defect due to the ghost phenomenon.

The term "gallium phthalocyanine crystal containing the amine compound represented by the formula (1) in itself" means that the crystal incorporates the amine compound represented by the formula (1) in itself. A method of producing the gallium phthalocyanine crystal containing the amine compound represented by the formula (1) in itself is described.

The gallium phthalocyanine crystal containing the amine compound represented by the formula (1) in itself of the present invention is preferably obtained by adding, in the process of subjecting a low-crystalline gallium phthalocyanine treated by an acid pasting method to a wet milling treatment to perform its crystal transformation, the amine compound represented by the formula (1), followed by a milling treatment with a solvent.

The milling treatment to be performed here is, for example, a treatment to be performed with a milling apparatus such as a sand mill and a ball mill together with a dispersant such as a glass bead, a steel bead, and an alumina ball. A milling time is preferably about 4 to 48 hours. A particularly preferred method is as described below. The sample is taken every 4 to 8 hours and the Bragg angle of the crystal is identified. The amount of the dispersant to be used in the milling treatment is preferably 10 to 50 times as large as that of the gallium phthalocyanine on a mass basis. In addition, examples of the solvent to be used include: an amide-based solvent such as N,N-dimethylformamide, N,N-dimethylacetamide, N-methylformamide, N-methylacetamide, and N-methylpropioamide; a halogen-based solvent such as chloroform; an ether-based solvent such as tetrahydrofuran; and a sulfoxide-based solvent such as dimethyl sulfoxide. The usage of the solvent is preferably 5 to 30 times as large as that of the gallium phthalocyanine on a mass basis. The usage of the amine compound represented by the formula (1) is preferably 0.1 to 10 times as large as that of the gallium phthalocyanine on a mass basis.

Whether the gallium phthalocyanine crystal of the present invention contained the amine compound in itself was determined by analyzing data on the thermogravimetric (TG) measurement, X-ray diffraction measurement, and NMR measurement of the resultant gallium phthalocyanine crystal.

For example, when a system to which a compound to be incorporated has been added and a gallium phthalocyanine crystal obtained by the same preparation except that the compound is not added are individually subjected to TG measurement, and the result of the TG measurement of the gallium phthalocyanine crystal obtained in the system to which the compound to be incorporated has been added can be interpreted as a result obtained merely by mixing individual measured results at a predetermined ratio, the system can be interpreted as a mixture of the crystal and the compound or as such a product that the compound merely adheres to the surface of the crystal.

On the other hand, when the result of the TG measurement of the gallium phthalocyanine crystal obtained in the system to which the compound to be incorporated has been added is such that a weight reduction occurs at a higher temperature than that in the case of the result of the TG measurement of the compound to be incorporated, it can be judged that the compound to be incorporated is incorporated into the crystal.

In addition, when the result of the X-ray diffraction of the system can be interpreted as a result obtained merely by mixing individual measured results at a predetermined ratio, the system can be interpreted as a mixture of the crystal and the compound or as such a product that the compound merely adheres to the surface of the crystal.

On the other hand, when no X-ray diffraction of the compound to be incorporated exists or when the resultant crystal form is changed, it can be judged that the compound to be incorporated is incorporated into the crystal.

Further, in the case where a milling treatment with a solvent capable of dissolving the compound to be incorporated or a washing process after the milling is sufficiently performed, when the compound to be incorporated is detected in NMR measurement, it can be judged that the compound to be incorporated is incorporated into the crystal.

The TG measurement, X-ray diffraction measurement, and NMR measurement of the phthalocyanine crystal of the present invention were performed under the following conditions.

(TG Measurement)
Used measuring apparatus: TG/DTA simultaneous measurement apparatus (trade name: TG/DTA220U) manufactured by Seiko Instruments Inc.
Atmosphere: under nitrogen flow (300 m$^2$/min)
Measurement range: 35° C. to 600° C.
Temperature increasing rate: 10° C./min
(Powder X-Ray Diffraction Measurement)
Used measuring apparatus: X-ray diffractometer RINT-TTRII manufactured by Rigaku Corporation
X-ray tube bulb: Cu
Tube voltage: 50 KV
Tube current: 300 mA
Scanning method: 2θ/θ scan
Scanning rate: 4.0°/min
Sampling interval: 0.02°
Start angle (2θ): 5.0°
Stop angle (2θ): 40.0°
Attachment: standard sample holder
Filter: not used Incident monochrome: used
Counter monochromator: not used
Divergence slit: open
Divergence longitudinal restriction slit: 10.00 mm
Scattering slit: open
Light-receiving slit: open
Flat monochromator: used
Counter: scintillation counter
(NMR Measurement)
Used measuring apparatus: AVANCE III 500 manufactured by BRUKER
Solvent: deuterated sulfuric acid ($D_2SO_4$)

The gallium phthalocyanine crystal containing the amine compound represented by the formula (1) in itself of the present invention is excellent in function as a photoconductor and is hence applicable to a solar cell, a sensor, a switching element, or the like as well as to an electrophotographic photosensitive member.

Next, the case where the gallium phthalocyanine crystal containing the amine compound represented by the formula (1) in itself of the present invention is applied as a charge-generating substance in an electrophotographic photosensitive member is described.

Photosensitive layers are classified into a photosensitive layer formed of a single layer containing both the charge-generating substance and a charge-transporting substance (single-layer photosensitive layer), and a photosensitive layer obtained by laminating a charge-generating layer containing the charge-generating substance and a charge-transporting layer containing the charge-transporting substance (laminated photosensitive layer). It should be noted that the charge-generating layer may be laminated on the charge-transporting layer and vice versa.

The support to be used in the present invention is preferably a support having electro-conductivity (electro-conductive support). As the support, there may be used, for example, aluminum, an aluminum alloy, copper, zinc, stainless, vanadium, molybdenum, chromium, titanium, nickel, indium, gold, and platinum. In addition, there may be used: a plastic (e.g., a polyethylene, a polypropylene, a polyvinyl chloride, a polyethylene terephthalate, an acrylic resin, and a polyfluoroethylene) having a layer of aluminum, an aluminum alloy, indium oxide, tin oxide, or an indium oxide-tin oxide alloy formed into a film by vacuum vapor deposition; a support obtained by coating a plastic or the above-mentioned support with electro-conductive particles (e.g., aluminum particles, titanium oxide particles, tin oxide particles, zinc oxide particles, carbon black, and silver particles) and a binder resin; a support obtained by impregnating a plastic or paper with electro-conductive particles; a plastic including an electro-conductive polymer; and the like.

In the present invention, an undercoat layer having a barrier function and an adhesion function (sometimes referred to as "barrier layer" or "intermediate layer") may be provided between the support and the photosensitive layer.

As the material for the undercoat layer, there may be used a polyvinyl alcohol, a polyethylene oxide, ethyl cellulose, methyl cellulose, casein, polyamides (e.g., nylon 6, nylon 66, nylon 610, a copolymer nylon, and an N-alkoxymethylated nylon), a polyurethane, glue, aluminum oxide, gelatin, and the like. The thickness of the undercoat layer is 0.1 to 10 µm, preferably 0.5 to 5 µm.

When the single-layer photosensitive layer is formed, the formation thereof can be performed by: mixing the charge-generating substance made of the gallium phthalocyanine crystal according to the present invention and the charge-transporting substance into a binder resin solution; applying the mixed liquid onto the support; and drying the resultant applied film.

When the laminated photosensitive layer is formed, the charge-generating layer can be formed by: applying a coating liquid for a charge-generating layer obtained by dispersing the gallium phthalocyanine crystal according to the present invention in a binder resin solution; and drying the resultant applied film. Alternatively, the charge-generating layer can be formed by vapor deposition.

The charge-transporting layer may be formed by: applying a coating liquid for a charge-transporting layer obtained by dissolving the charge-transporting substance and a binder resin in a solvent; and drying the resultant applied film.

Examples of the charge-transporting substance include a triarylamine-based compound, a hydrazone-based compound, a stilbene-based compound, a pyrazoline-based compound, an oxazole-based compound, a thiazole-based compound, and a triarylmethane-based compound.

Examples of the binding resin to be used for each layer include resins such as a polyester, an acrylic resin, a polyvinylcarbazole, a phenoxy resin, a polycarbonate, a polyvinyl butyral, a polystyrene, a polyvinyl acetate, a polysulfone, a polyarylate, vinylidene chloride, an acrylonitrile copolymer, and a polyvinyl benzal.

An application method such as a dipping method, a spray coating method, a spinner coating method, a bead coating method, a blade coating method, and a beam coating method can be used as a method of applying the photosensitive layer.

When the photosensitive layer is of a single-layer type, its thickness is preferably 5 to 40 µm, more preferably 10 to 30 µm.

When the photosensitive layer is of a laminated type, the thickness of the charge-generating layer is preferably 0.01 to 10 µm, more preferably 0.1 to 3 µm. In addition, the thickness of the charge-transporting layer is preferably 5 to 40 µm, more preferably 10 to 30 µm.

When the photosensitive layer is of a laminated type, the content of the charge-generating substance is preferably 20 to 90 mass %, more preferably 50 to 80 mass % with respect to the total mass of the charge-generating layer. In addition, the content of the charge-transporting substance is preferably 20 to 80 mass %, more preferably 30 to 70 mass % with respect to the total mass of the charge-transporting layer.

When the photosensitive layer is of a single-layer type, the content of the charge-generating substance is preferably 3 to 30 mass % with respect to the total mass of the photosensitive layer. In addition, the content of the charge-transporting substance is preferably 30 to 70 mass % with respect to the total mass of the photosensitive layer.

When the gallium phthalocyanine crystal according to the present invention is used as a charge-generating substance, the substance can be mixed with any other charge-generating substance before use. In this case, the content of the gallium phthalocyanine crystal is preferably 50 mass % or more with respect to all charge-generating substances.

A protective layer may be provided on the photosensitive layer as required. The protective layer can be formed by: applying a coating liquid for the protective layer, which is obtained by dissolving a resin such as a polyvinyl butyral, a polyester, a polycarbonate (e.g., a polycarbonate Z and a modified polycarbonate), a nylon, a polyimide, a polyarylate, a polyurethane, a styrene-butadiene copolymer, a styrene-acrylic acid copolymer, and a styrene-acrylonitrile copolymer in an organic solvent, onto the photosensitive layer; and drying the resultant applied film.

The thickness of the protective layer is preferably 0.05 to 20 μm.

An electro-conductive particle, a UV absorber, or the like may be incorporated into the protective layer. Examples of the electro-conductive particle include metal oxide particles such as a tin oxide particle.

FIG. 1 is a view illustrating an example of the schematic configuration of an electrophotographic apparatus provided with a process cartridge having the electrophotographic photosensitive member of the present invention.

A cylindrical (drum-shaped) electrophotographic photosensitive member 1 is rotationally driven about an axis 2 in a direction indicated by an arrow at a predetermined peripheral speed (process speed).

The surface of the electrophotographic photosensitive member 1 is charged to a predetermined positive or negative electric potential by a charging unit 3 during the rotation process. Next, the charged surface of the electrophotographic photosensitive member 1 is irradiated with image exposure light 4 from an image exposing unit (not shown) and then an electrostatic latent image corresponding to target image information is formed. The image exposure light 4 is, for example, light to be output from the image exposing unit such as a slit exposure and a laser beam scanning exposure, the light having intensity modulated in correspondence with a time-series electrical digital image signal of the target image information.

The electrostatic latent image formed on the surface of the electrophotographic photosensitive member 1 is developed (subjected to normal development or reversal development) with toner stored in a developing unit 5. Thus, a toner image is formed on the surface of the electrophotographic photosensitive member 1. The toner image formed on the surface of the electrophotographic photosensitive member 1 is transferred onto a transfer material 7 by a transferring unit 6. At this time, a bias voltage opposite in polarity to the charge which the toner possesses is applied from a bias power source (not shown) to the transferring unit 6. In addition, when the transfer material 7 is paper, the transfer material 7 is taken out of a sheet-feeding portion (not shown), and is then fed into a gap between the electrophotographic photosensitive member 1 and the transferring unit 6 in synchronization with the rotation of the electrophotographic photosensitive member 1.

The transfer material 7 onto which the toner image has been transferred from the electrophotographic photosensitive member 1 is separated from the surface of the electrophotographic photosensitive member 1 and then conveyed to an image fixing unit 8 where the transfer material is subjected to a treatment for fixing the toner image. Thus, the transfer material is printed out as an image-formed product (print or copy) to the outside of the electrophotographic apparatus.

The surface of the electrophotographic photosensitive member 1 after the transfer of the toner image onto the transfer material 7 is subjected to the removal of an attached matter such as the toner (transfer residual toner) by a cleaning unit 9, thereby being cleaned. A cleaner-less system has been developed in recent years and hence the transfer residual toner can be directly removed with developing equipment or the like. Further, the surface of the electrophotographic photosensitive member 1 is subjected to a neutralization treatment by pre-exposure light 10 from pre-exposing unit (not shown) before being repeatedly used for image formation. It should be noted that when the charging unit 3 is a contact charging unit using a charging roller or the like, the pre-exposing unit is not necessarily needed.

In the present invention, the following configuration can be adopted. Multiple components out of the components such as the electrophotographic photosensitive member 1, the charging unit 3, the developing unit 5, and the cleaning unit 9 are stored in a container and integrally supported to form a process cartridge, and then the process cartridge can be detachably mountable to the main body of the electrophotographic apparatus. For example, the following configuration can be adopted. At least one selected from the charging unit 3, the developing unit 5, and the cleaning unit 9 is integrally supported with the electrophotographic photosensitive member 1 to provide a cartridge, and then the cartridge is used as a process cartridge 11 detachably mountable to the main body of the electrophotographic apparatus with a guiding unit 12 such as a rail of the main body of the electrophotographic apparatus.

When the electrophotographic apparatus is a copying machine or a printer, the image exposure light 4 may be reflected light or transmitted light from a manuscript. Alternatively, the light may be light radiated by, for example, scanning with a laser beam, the driving of an LED array, or the driving of a liquid crystal shutter array to be performed in accordance with a signal turned from the manuscript read with a sensor.

The electrophotographic photosensitive member 1 of the present invention is also widely applicable to the fields of application of electrophotography such as a laser beam printer, a CRT printer, an LED printer, a FAX, a liquid crystal printer, and laser plate making.

EXAMPLES

Hereinafter, the present invention is described in more detail by way of specific examples, provided that the present invention is not limited to these examples. It should be noted that the thickness of each layer of any one of the electrophotographic photosensitive members of examples and comparative examples was determined with an eddy-current thickness meter (Fischerscope manufactured by Fischer Instruments), or was determined from its mass per unit area by specific gravity conversion.

Example 1-1

Figure 2A:
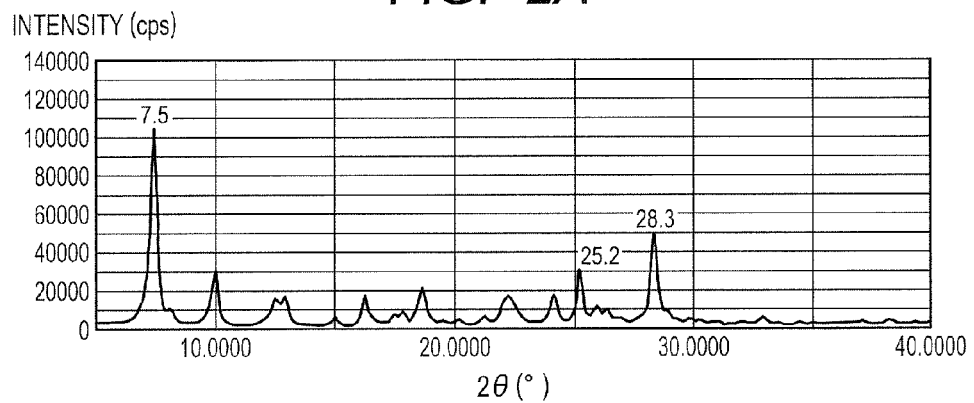
FIG. 2A is a powder X-ray diffraction pattern of a hydroxygallium phthalocyanine crystal obtained in Example 1-1.
Figure 2B:
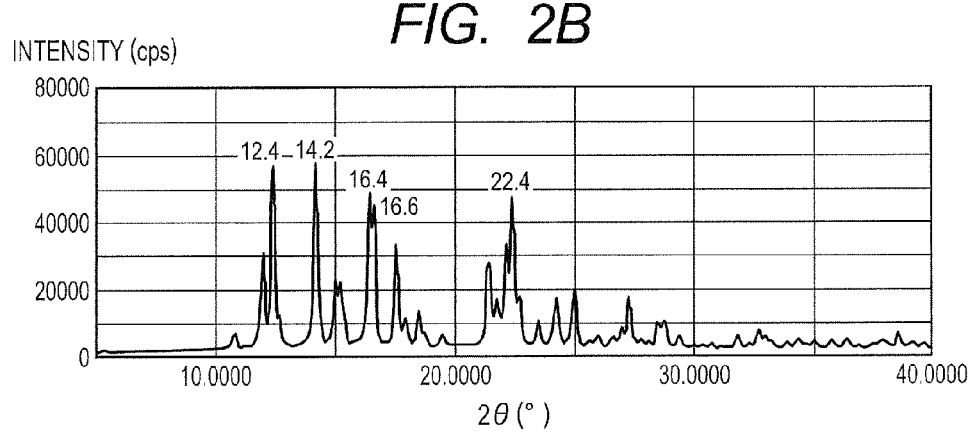
FIG. 2B is a powder X-ray diffraction pattern of Exemplified Compound (2) used in Example 1-1.

0.5 Part of hydroxygallium phthalocyanine obtained by the same treatment as that of Example 1-1 subsequent to Synthesis Example 1 described in Japanese Patent Application Laid-Open No. 2011-94101, 0.1 part of Exemplified Compound (2) (product code: B1275, manufactured by TOKYO CHEMICAL INDUSTRY CO., LTD.), and 10 parts of N,N-dimethylformamide were subjected to a milling treatment in a ball mill together with 20 parts of glass beads each having a diameter of 0.8 mm at room temperature (23° C.) for 40 hours. A gallium phthalocyanine crystal was taken out of the dispersion with N,N-dimethylformamide and filtered, and then the residue on the filter was sufficiently washed with tetrahydrofuran. The filter residue was vacuum-dried to yield 0.45 part of a hydroxygallium phthalocyanine crystal. FIG. 2A shows the powder X-ray diffraction pattern of the resultant crystal and FIG. 2B shows the powder X-ray diffraction pattern of Exemplified Compound (2) used here.

In addition, Table 1 shows an excerpt of TG data on the resultant crystal and Exemplified Compound (2). As shown in the excerpt, no increase in weight reduction amount is observed in the range of 200° C. to 360° C. showing a weight reduction caused by the evaporation of Exemplified Compound (2) alone but a weight reduction amount increases in a range not less than 360° C., indicating that the amine compound represented by the formula (1) (Exemplified Compound (2)) is incorporated into the hydroxygallium phthalocyanine crystal obtained in Example 1-1.

In addition, NMR measurement confirmed that Exemplified Compound (2) was incorporated at 0.17% into the crystal.

Example 1-2

0.45 Part of a hydroxygallium phthalocyanine crystal was obtained by the same treatment as that of Example 1-1 except that in Example 1-1, 0.1 part of Exemplified Compound (2) was changed to 0.5 part of Exemplified Compound (2). The powder X-ray diffraction pattern of the resultant hydroxygallium phthalocyanine crystal was the same as FIG. 2A.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 360° C., indicating that the amine compound represented by the formula (1) (Exemplified Compound (2)) is incorporated into the hydroxygallium phthalocyanine crystal obtained in Example 1-2.

In addition, NMR measurement confirmed that Exemplified Compound (2) was incorporated at 0.30% into the crystal.

Example 1-3

Figure 3A:
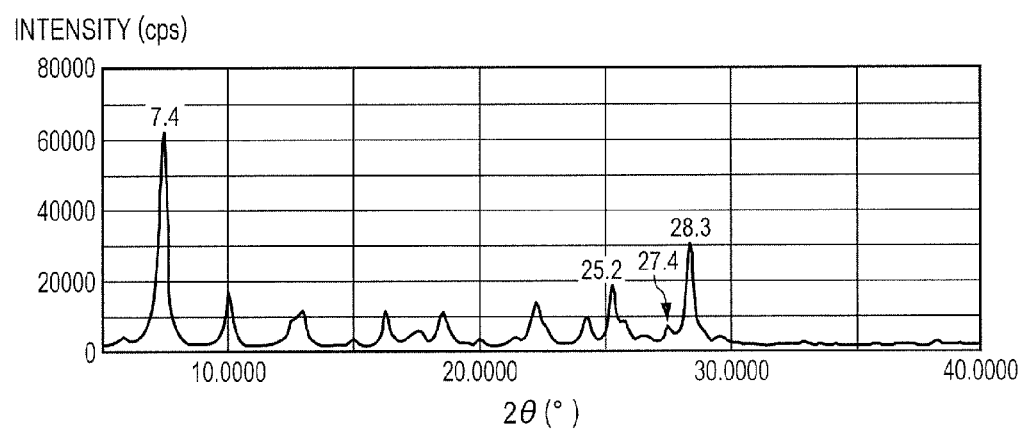
FIG. 3A is a powder X-ray diffraction pattern of a hydroxygallium phthalocyanine crystal obtained in Example 1-3.

0.5 Part of a hydroxygallium phthalocyanine crystal was obtained by the same treatment as that of Example 1-1 except that in Example 1-1, 0.1 part of Exemplified Compound (2) was changed to 1.0 part of Exemplified Compound (2). FIG. 3A shows the powder X-ray diffraction pattern of the resultant crystal. A peak intensity at 27.4° was 12% with respect to a peak intensity at 7.4°.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 360° C., indicating that the amine compound represented by the formula (1) (Exemplified Compound (2)) is incorporated into the hydroxygallium phthalocyanine crystal obtained in Example 1-3.

In addition, NMR measurement confirmed that Exemplified Compound (2) was incorporated at 0.81% into the crystal.

Example 1-4

Figure 3B:
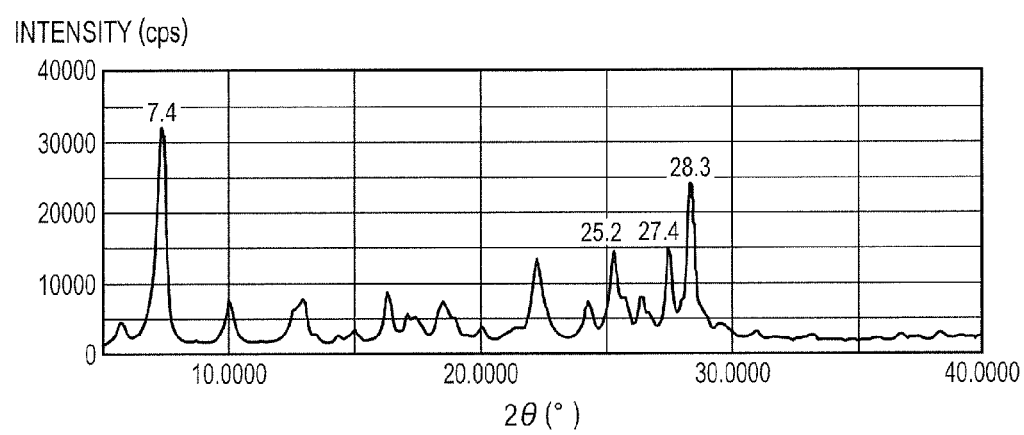
FIG. 3B is a powder X-ray diffraction pattern of a hydroxygallium phthalocyanine crystal obtained in Example 1-4.

0.5 Part of a hydroxygallium phthalocyanine crystal was obtained by the same treatment as that of Example 1-1 except that in Example 1-1, 0.1 part of Exemplified Compound (2) was changed to 2.0 parts of Exemplified Compound (2). FIG. 3B shows the powder X-ray diffraction pattern of the resultant crystal. A peak intensity at 27.4° was 46% with respect to a peak intensity at 7.4°.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 360° C., indicating that the amine compound represented by the formula (1) (Exemplified Compound (2)) is incorporated into the hydroxygallium phthalocyanine crystal obtained in Example 1-4.

In addition, NMR measurement confirmed that Exemplified Compound (2) was incorporated at 2.13% into the crystal.

Example 1-5

Figure 4A:
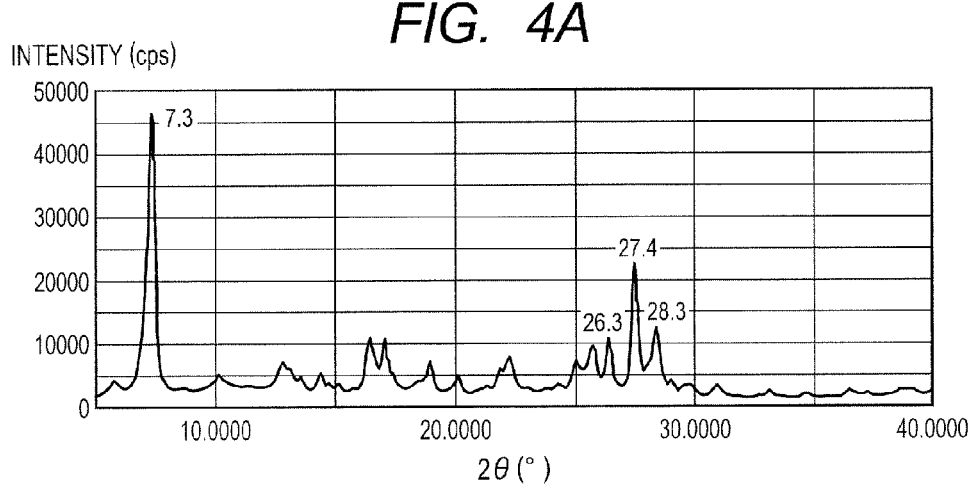
FIG. 4A is a powder X-ray diffraction pattern of a hydroxygallium phthalocyanine crystal obtained in Example 1-5.

0.4 Part of a hydroxygallium phthalocyanine crystal was obtained by the same treatment as that of Example 1-1 except that in Example 1-1, 0.1 part of Exemplified Compound (2) was changed to 3.0 parts of Exemplified Compound (2). FIG. 4A shows the powder X-ray diffraction pattern of the resultant crystal. A peak intensity at 27.4° was 49% with respect to a peak intensity at 7.4°.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 360° C., indicating that the amine compound represented by the formula (1) (Exemplified Compound (2)) is incorporated into the hydroxygallium phthalocyanine crystal obtained in Example 1-5.

In addition, NMR measurement confirmed that Exemplified Compound (2) was incorporated at 1.64% into the crystal.

Example 1-6

Figure 4B:
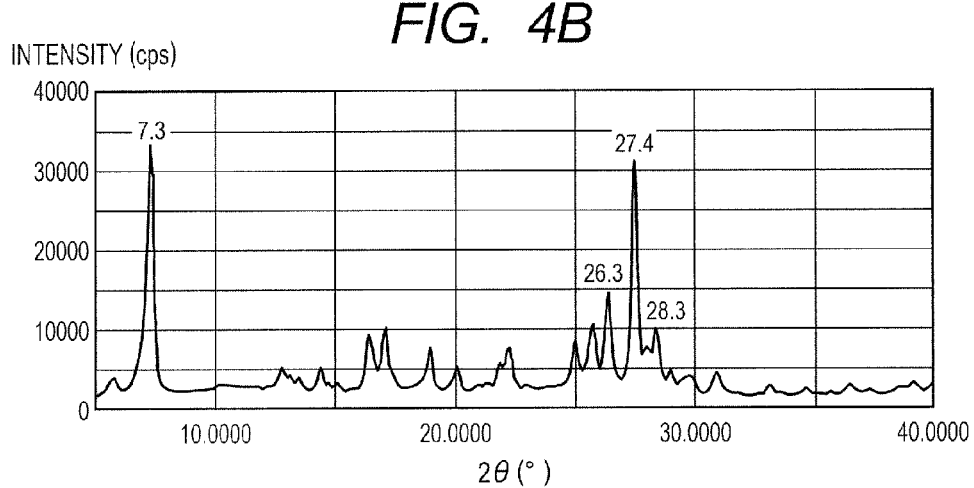
FIG. 4B is a powder X-ray diffraction pattern of a hydroxygallium phthalocyanine crystal obtained in Example 1-6.

0.36 Part of a hydroxygallium phthalocyanine crystal was obtained by the same treatment as that of Example 1-1 except that in Example 1-1, 0.1 part of Exemplified Compound (2) was changed to 4.0 parts of Exemplified Compound (2). FIG. 4B shows the powder X-ray diffraction pattern of the resultant crystal. A peak intensity at 27.4° was 96% with respect to a peak intensity at 7.4°.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 360° C., indicating that the amine compound represented by the formula (1) (Exemplified Compound (2)) is incorporated into the hydroxygallium phthalocyanine crystal obtained in Example 1-6.

In addition, NMR measurement confirmed that Exemplified Compound (2) was incorporated at 1.63% into the crystal.

Example 1-7

Figure 4C:
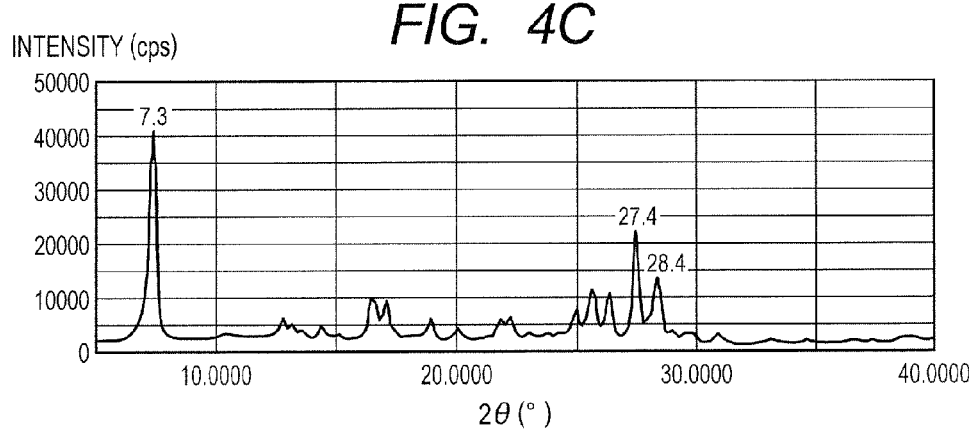
FIG. 4C is a powder X-ray diffraction pattern of a hydroxygallium phthalocyanine crystal obtained in Example 1-7.

0.45 Part of a hydroxygallium phthalocyanine crystal was obtained by the same treatment as that of Example 1-1 except that in Example 1-1, 0.1 part of Exemplified Compound (2) was changed to 5.0 parts of Exemplified Compound (2). FIG. 4C shows the powder X-ray diffraction pattern of the resultant crystal. A peak intensity at 27.4° was 56% with respect to a peak intensity at 7.4°.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 360° C., indicating that the amine compound represented by the formula (1) (Exemplified Compound (2)) is incorporated into the hydroxygallium phthalocyanine crystal obtained in Example 1-7.

In addition, NMR measurement confirmed that Exemplified Compound (2) was incorporated at 0.50% into the crystal.

Example 1-8

0.5 Part of a hydroxygallium phthalocyanine crystal was obtained by the same treatment as that of Example 1-1 except that in Example 1-1, 0.1 part of Exemplified Compound (2) was changed to 1.0 part of Exemplified Compound (1) (product code: 159400050, manufactured by Acros Organics). The powder X-ray diffraction pattern of the resultant hydroxygallium phthalocyanine crystal was the same as FIG. 2A.

In addition, Table 1 shows an excerpt of TG data on the resultant crystal. As shown in the excerpt, a weight reduction amount increases in a range not less than 500° C., which is higher than the evaporation temperature of Exemplified Compound (1) alone (200° C. to 305° C.), indicating that the amine compound represented by the formula (1) (Exemplified Compound (1)) is incorporated into the hydroxygallium phthalocyanine crystal obtained in Example 1-8.

In addition, NMR measurement confirmed that Exemplified Compound (1) was incorporated at 0.31% into the crystal.

Example 1-9

0.45 Part of a hydroxygallium phthalocyanine crystal was obtained by the same treatment as that of Example 1-1 except that in Example 1-1, 0.1 part of Exemplified Compound (2) was changed to 2.0 parts of Exemplified Compound (1). The powder X-ray diffraction pattern of the resultant hydroxygallium phthalocyanine crystal was the same as FIG. 2A.

In addition, Table 1 shows an excerpt of TG data on the resultant crystal. As shown in the excerpt, a weight reduction amount increases in a range not less than 305° C., which is higher than the evaporation temperature of Exemplified Compound (1) alone (200° C. to 305° C.), indicating that the amine compound represented by the formula (1) (Exemplified Compound (1)) is incorporated into the hydroxygallium phthalocyanine crystal obtained in Example 1-9.

In addition, NMR measurement confirmed that Exemplified Compound (1) was incorporated at 0.82% into the crystal.

Example 1-10

0.43 Part of a hydroxygallium phthalocyanine crystal was obtained by the same treatment as that of Example 1-1 except that in Example 1-1, 0.1 part of Exemplified Compound (2) was changed to 1.0 part of Exemplified Compound (3) (product code: B1212, manufactured by TOKYO CHEMICAL INDUSTRY CO., LTD.). The powder X-ray diffraction pattern of the resultant hydroxygallium phthalocyanine crystal was the same as FIG. 2A.

In addition, Table 1 shows an excerpt of TG data on the resultant crystal. As shown in the excerpt, a weight reduction amount increases in a range not less than 450° C., which is higher than the evaporation temperature of Exemplified Compound (3) alone (250° C. to 390° C.), indicating that the amine compound represented by the formula (1) (Exemplified Compound (3)) is incorporated into the hydroxygallium phthalocyanine crystal obtained in Example 1-10.

In addition, NMR measurement confirmed that Exemplified Compound (3) was incorporated at 2.09% into the crystal.

Example 1-11

0.5 Part of a hydroxygallium phthalocyanine crystal was obtained by the same treatment as that of Example 1-1 except that in Example 1-1, 0.1 part of Exemplified Compound (2) was changed to 1.0 part of Exemplified Compound (4) (product code: B1433, manufactured by TOKYO CHEMICAL INDUSTRY CO., LTD.). The powder X-ray diffraction pattern of the resultant hydroxygallium phthalocyanine crystal was the same as FIG. 2A.

In addition, Table 1 shows an excerpt of TG data on the resultant crystal. As shown in the excerpt, a weight reduction amount increases in a range not less than 450° C., which is higher than the evaporation temperature of Exemplified Compound (4) alone (250° C. to 370° C.), indicating that the amine compound represented by the formula (1) (Exemplified Compound (4)) is incorporated into the hydroxygallium phthalocyanine crystal obtained in Example 1-11.

In addition, NMR measurement confirmed that Exemplified Compound (4) was incorporated at 0.28% into the crystal.

Example 1-12

0.34 Part of a hydroxygallium phthalocyanine crystal was obtained by the same treatment as that of Example 1-1 except that in Example 1-1, 0.1 part of Exemplified Compound (2) was changed to 1.0 part of Exemplified Compound (24) obtained in the synthesis example described above. The powder X-ray diffraction pattern of the resultant hydroxygallium phthalocyanine crystal was the same as FIG. 2A.

In addition, Table 1 shows an excerpt of TG data on the resultant crystal. As shown in the excerpt, a weight reduction amount increases in a range not less than 460° C., which is higher than the evaporation temperature of Exemplified Compound (24) alone (330° C. to 460° C.), indicating that the amine compound represented by the formula (1) (Exemplified Compound (24)) is incorporated into the hydroxygallium phthalocyanine crystal obtained in Example 1-12.

In addition, NMR measurement confirmed that Exemplified Compound (24) was incorporated at 0.16% into the crystal.

Example 1-13

Figure 5A:
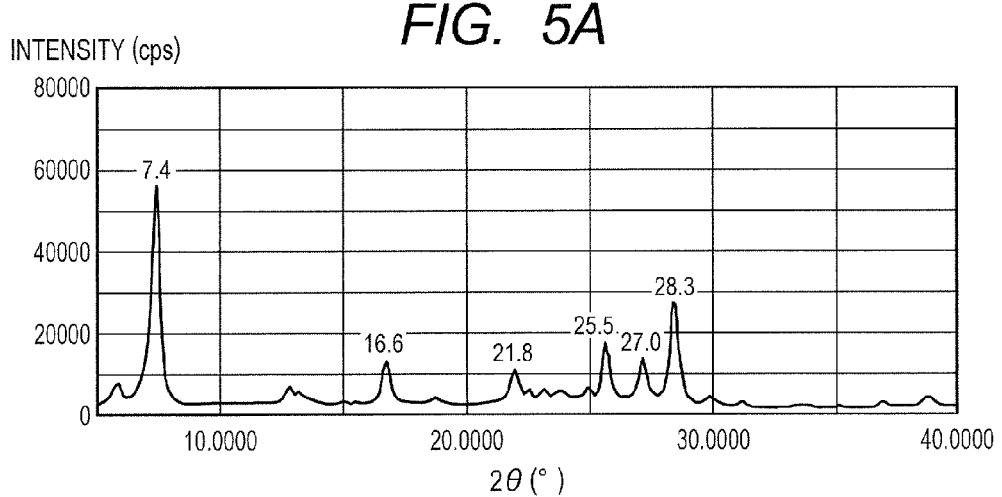
FIG. 5A is a powder X-ray diffraction pattern of a hydroxygallium phthalocyanine crystal obtained in Example 1-13.

0.5 Part of hydroxygallium phthalocyanine obtained by the same treatment as that of Example 1-1 subsequent to Synthesis Example 1 described in Japanese Patent Application Laid-Open No. 2011-94101, 2 parts of Exemplified Compound (2) (product code: B1275, manufactured by TOKYO CHEMICAL INDUSTRY CO., LTD.), and 10 parts of tetrahydrofuran were subjected to a milling treatment in a ball mill together with 20 parts of glass beads each having a diameter of 0.8 mm at room temperature (23° C.) for 40 hours. A gallium phthalocyanine crystal was taken out of the dispersion with tetrahydrofuran and filtered, and then the residue on the filter was sufficiently washed with tetrahydrofuran. The filter residue was vacuum-dried to yield 0.3 part of a hydroxygallium phthalocyanine crystal. FIG. 5A shows the powder X-ray diffraction pattern of the resultant crystal. A peak intensity at 27.0° was 26% with respect to a peak intensity at 7.4°.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 360° C., indicating that the amine compound represented by the formula (1) (Exemplified Compound (2)) is incorporated into the hydroxygallium phthalocyanine crystal obtained in Example 1-13.

In addition, NMR measurement confirmed that Exemplified Compound (2) was incorporated at 2.04% into the crystal.

Example 1-14

Figure 5B:
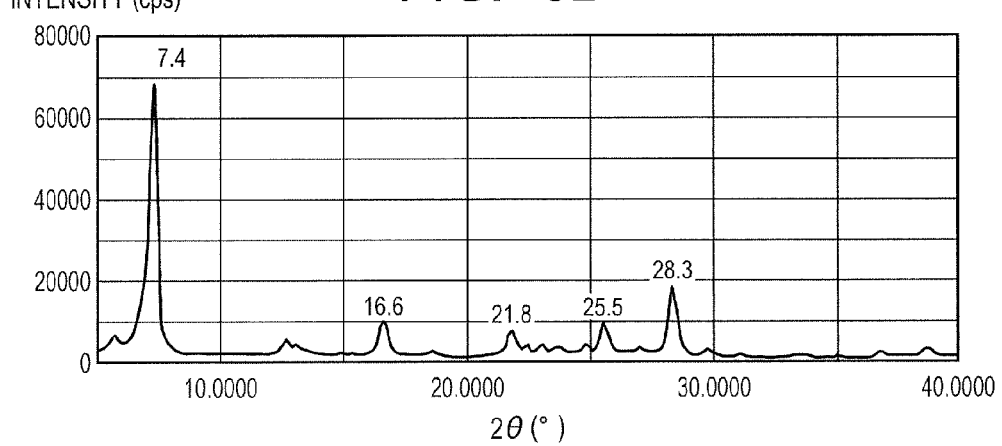
FIG. 5B is a powder X-ray diffraction pattern of a hydroxygallium phthalocyanine crystal obtained in Example 1-14.

0.5 Part of a hydroxygallium phthalocyanine crystal was obtained by the same treatment as that of Example 1-13 except that in Example 1-13, 2 parts of Exemplified Compound (2) were changed to 3.0 parts of Exemplified Compound (2). FIG. 5B shows the powder X-ray diffraction pattern of the resultant crystal.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 360° C., indicating that the amine compound represented by the formula (1) (Exemplified Compound (2)) is incorporated into the hydroxygallium phthalocyanine crystal obtained in Example 1-14.

In addition, NMR measurement confirmed that Exemplified Compound (2) was incorporated at 1.58% into the crystal.

Example 1-15

Figure 6:
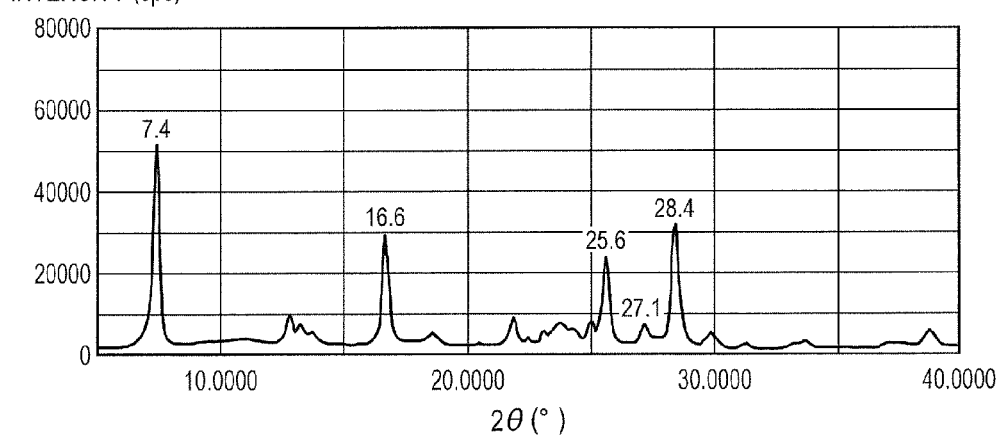
FIG. 6 is a powder X-ray diffraction pattern of a bromogallium phthalocyanine crystal obtained in Example 1-15.

0.5 Part of bromogallium phthalocyanine obtained by the same treatment as that of Example 60 described in Japanese Patent Application Laid-Open No. H11-172143, 2 parts of Exemplified Compound (2) (product code: B1275, manufactured by TOKYO CHEMICAL INDUSTRY CO., LTD.), and 10 parts of N,N-dimethylformamide were subjected to a milling treatment in a ball mill together with 20 parts of glass beads each having a diameter of 0.8 mm at room temperature (23° C.) for 40 hours. A gallium phthalocyanine crystal was taken out of the dispersion with N,N-dimethylformamide and filtered, and then the residue on the filter was sufficiently washed with tetrahydrofuran. The filter residue was vacuum-dried to yield 0.36 part of a bromogallium phthalocyanine crystal. FIG. 6 shows the powder X-ray diffraction pattern of the resultant crystal. A peak intensity at 27.1° was 15% with respect to a peak intensity at 7.4°.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 500° C., indicating that the amine compound represented by the formula (1) (Exemplified Compound (2)) is incorporated into the bromogallium phthalocyanine crystal obtained in Example 1-15.

In addition, NMR measurement confirmed that Exemplified Compound (2) was incorporated at 2.37% into the crystal.

Example 1-16

0.5 Part of iodogallium phthalocyanine obtained by the same treatment as that of Example 1-14 described in Japanese Patent Application Laid-Open No. H11-172143, 1.0 part of Exemplified Compound (2) (product code: B1275, manufactured by TOKYO CHEMICAL INDUSTRY CO., LTD.), and 10 parts of N,N-dimethylformamide were subjected to a milling treatment in a ball mill together with 20 parts of glass beads each having a diameter of 0.8 mm at room temperature (23° C.) for 40 hours. A gallium phthalocyanine crystal was taken out of the dispersion with N,N-dimethylformamide and filtered, and then the residue on the filter was sufficiently washed with tetrahydrofuran. The filter residue was vacuum-dried to yield 0.26 part of an iodogallium phthalocyanine crystal. FIG. 7A shows the powder X-ray diffraction pattern of the resultant crystal.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 500° C., indicating that the amine compound represented by the formula (1) (Exemplified Compound (2)) is incorporated into the iodogallium phthalocyanine crystal obtained in Example 1-16.

In addition, NMR measurement confirmed that Exemplified Compound (2) was incorporated at 0.39% into the crystal.

Example 1-17

0.31 Part of an iodogallium phthalocyanine crystal was obtained by the same treatment as that of Example 1-16 except that in Example 1-16, 1.0 part of Exemplified Compound (2) was changed to 2.0 parts of Exemplified Compound (2). FIG. 7B shows the powder X-ray diffraction pattern of the resultant crystal.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 500° C., indicating that the amine compound represented by the formula (1) (Exemplified Compound (2)) is incorporated into the iodogallium phthalocyanine crystal obtained in Example 1-17.

In addition, NMR measurement confirmed that Exemplified Compound (2) was incorporated at 0.11% into the crystal.

Example 1-18

0.30 Part of an iodogallium phthalocyanine crystal was obtained by the same treatment as that of Example 1-16 except that in Example 1-16, 1.0 part of Exemplified Compound (2) was changed to 3.0 parts of Exemplified Compound (2). FIG. 7C shows the powder X-ray diffraction pattern of the resultant crystal.

In addition, Table 1 shows an excerpt of TG data on the resultant crystal. As shown in the excerpt, no increase in weight reduction amount is observed in the range of 200° C. to 360° C. showing a weight reduction caused by the evaporation of Exemplified Compound (2) alone but a weight reduction amount increases in a range not less than 500° C., indicating that the amine compound represented by the formula (1) (Exemplified Compound (2)) is incorporated into the iodogallium phthalocyanine crystal obtained in Example 1-18.

In addition, NMR measurement confirmed that Exemplified Compound (2) was incorporated at 0.19% into the crystal.

Comparative Example 1-1

0.4 Part of a hydroxygallium phthalocyanine crystal was obtained by the same treatment as that of Example 1-1 except that in Example 1-1, 0.1 part of Exemplified Compound (2) was not added. The powder X-ray diffraction pattern of the resultant hydroxygallium phthalocyanine crystal was the same as FIG. 2A.

In addition, Table 1 shows an excerpt of TG data on the resultant crystal.

Comparative Example 1-2

0.38 Part of a hydroxygallium phthalocyanine crystal was obtained by the same treatment as that of Example 1-1 except that in Example 1-1, 0.1 part of Exemplified Compound (2) was changed to 1.0 part of 4,4'-dimethoxybenzophenone. The powder X-ray diffraction pattern of the resultant hydroxygallium phthalocyanine crystal was the same as FIG. 2A.

In addition, Table 1 shows an excerpt of TG data on the resultant crystal. As shown in the excerpt, a weight reduction amount increases in a range not less than 450° C., which is a temperature higher than the range of 170° C. to 300° C. showing a weight reduction caused by the evaporation of 4,4'-dimethoxybenzophenone, indicating that 4,4'-dimethoxybenzophenone is incorporated into the hydroxygallium phthalocyanine crystal obtained in Comparative Example 1-2.

Comparative Example 1-3

Figure 8:
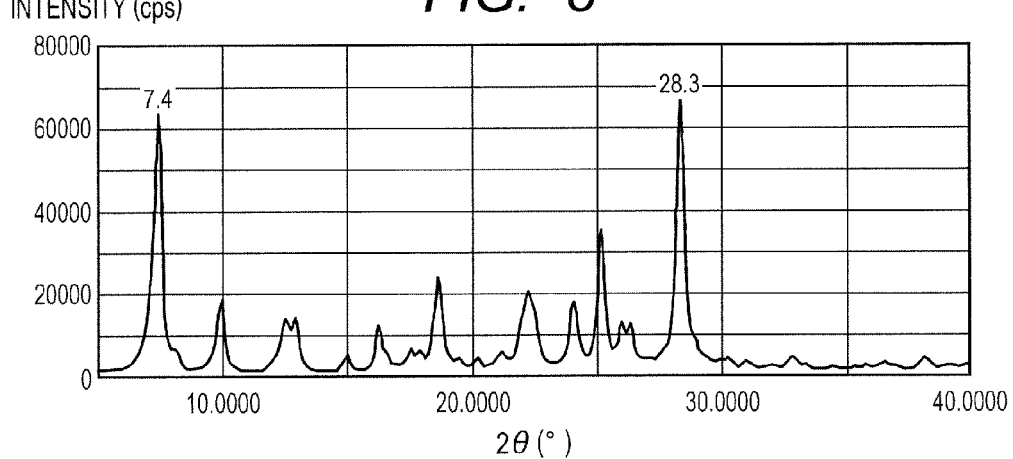
FIG. 8 is a powder X-ray diffraction pattern of a hydroxygallium phthalocyanine crystal obtained in Comparative Example 1-3.

0.4 Part of a hydroxygallium phthalocyanine crystal was obtained by the same treatment as that of Example 1-1 except that in Example 1-1, 0.1 part of Exemplified Compound (2) was changed to 1.0 part of 3,3'-dinitrobenzophenone. FIG. 8 shows the powder X-ray diffraction pattern of the resultant hydroxygallium phthalocyanine crystal.

In addition, Table 1 shows an excerpt of TG data on the resultant crystal. As shown in the excerpt, a weight reduction amount increases in a range not less than 360° C., which is a temperature higher than the range of 220° C. to 330° C. showing a weight reduction caused by the evaporation of 3,3'-dinitrobenzophenone, indicating that 3,3'-dinitrobenzophenone is incorporated into the hydroxygallium phthalocyanine crystal obtained in Comparative Example 1-3.

Comparative Example 1-4

0.14 Part of a hydroxygallium phthalocyanine crystal was obtained by the same treatment as that of Example 1-1 except that in Example 1-1, 0.1 part of Exemplified Compound (2) was changed to 1.0 part of benzophenone. The powder X-ray diffraction pattern of the resultant hydroxygallium phthalocyanine crystal was the same as FIG. 2A.

In addition, Table 1 shows an excerpt of TG data on the resultant crystal. As shown in the excerpt, a weight reduction amount increases in a range not less than 360° C., which is a temperature higher than the range of 100° C. to 226° C. showing a weight reduction caused by the evaporation of benzophenone, indicating that benzophenone is incorporated into the hydroxygallium phthalocyanine crystal obtained in Comparative Example 1-4.

Comparative Example 1-5

Figure 9A:
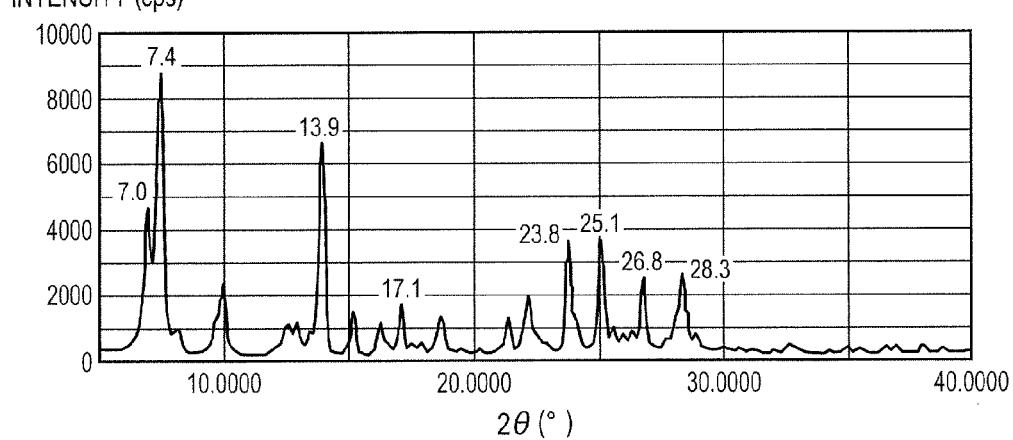
FIG. 9A is a powder X-ray diffraction pattern of a mixture containing a hydroxygallium phthalocyanine crystal obtained in Comparative Example 1-5.
Figure 9B:
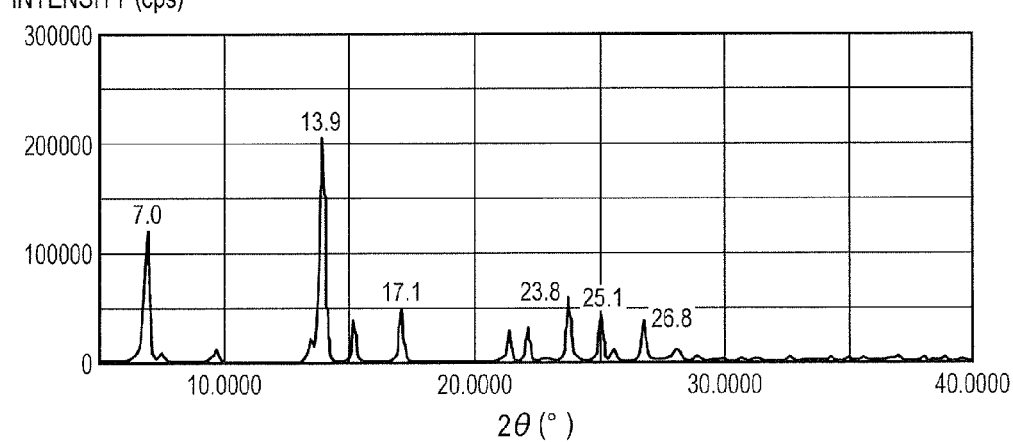
FIG. 9B is a powder X-ray diffraction pattern of 2-morpholinoanthraquinone used in Comparative Example 1-5.

1.0 Part of a mixture of a hydroxygallium phthalocyanine crystal having peaks at Bragg angles $2\theta\pm0.2°$ of 7.4° and 28.3° in CuKα characteristic X-ray diffraction and a 2-morpholinoanthraquinone crystal having peaks at Bragg angles $2\theta\pm0.2°$ of 7.0°, 13.9°, 17.1°, 23.8°, 25.1°, and 26.8° in CuKα characteristic X-ray diffraction was obtained by the same treatment as that of Example 1-1 except that in Example 1-1, 0.1 part of Exemplified Compound (2) was changed to 1.0 part of 2-morpholinoanthraquinone. FIG. 9A shows the powder X-ray diffraction pattern of the resultant mixture and FIG. 9B shows the powder X-ray diffraction pattern of 2-morpholinoanthraquinone added here.

In addition, Table 1 shows an excerpt of TG data on the resultant mixture. As shown in the excerpt, an increase in weight reduction amount is observed in the range of 200° C. to 350° C. showing a weight reduction caused by the evaporation of 2-morpholinoanthraquinone but no increase in weight reduction amount is observed at higher temperatures. Accordingly, it can be judged that the mixture is such a mere mixture that 2-morpholinoanthraquinone is not incorporated into the hydroxygallium phthalocyanine crystal. A mixing ratio "hydroxygallium phthalocyanine:2-morpholinoanthraquinone" can be calculated to be about 4:6 from the TG data.

Comparative Example 1-6

Figure 10A:
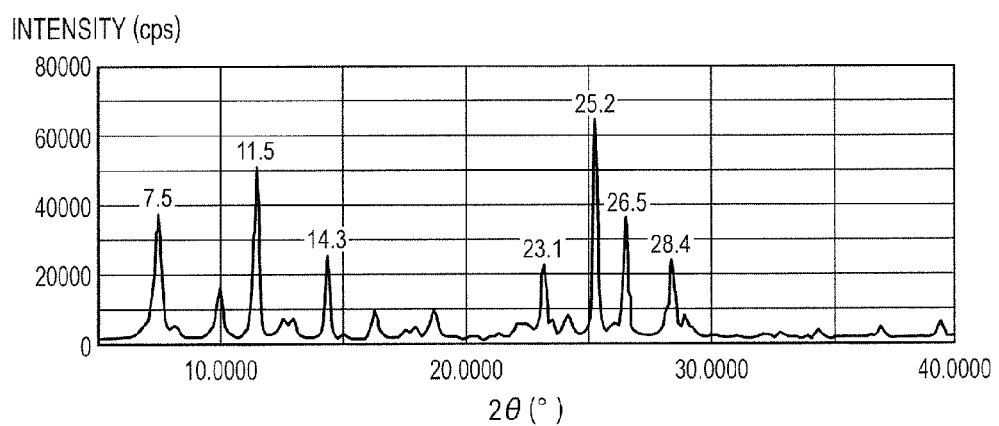
FIG. 10A is a powder X-ray diffraction pattern of a mixture containing a hydroxygallium phthalocyanine crystal obtained in Comparative Example 1-6.
Figure 10B:
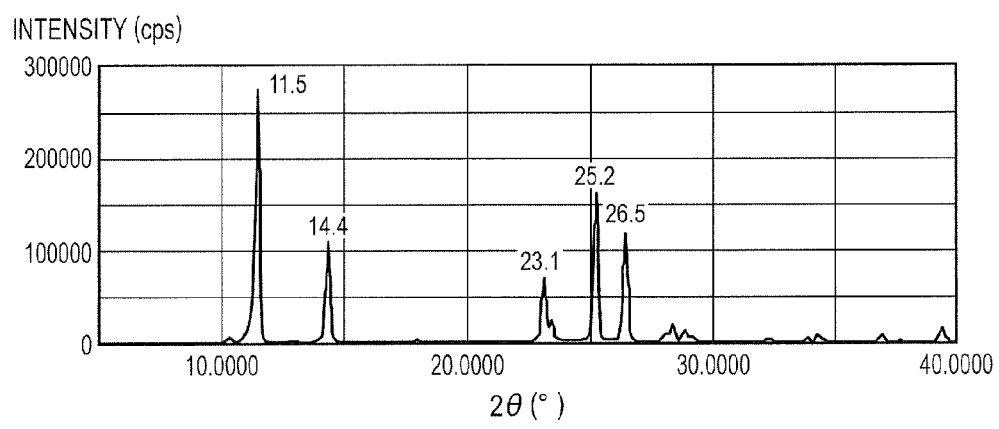
FIG. 10B is a powder X-ray diffraction pattern of anthraquinone used in Comparative Example 1-6.

0.8 Part of a mixture of a hydroxygallium phthalocyanine crystal having peaks at Bragg angles $2\theta\pm0.2°$ of 7.4° and 28.3° in CuKα characteristic X-ray diffraction and an anthraquinone crystal having peaks at Bragg angles $2\theta\pm0.2°$ of 11.5°, 14.4°, 23.1°, 25.2°, and 26.5° in CuKα characteristic X-ray diffraction was obtained by the same treatment as that of Example 1-1 except that in Example 1-1, 0.1 part of Exemplified Compound (2) was changed to 1.0 part of anthraquinone. FIG. 10A shows the powder X-ray diffraction pattern of the resultant mixture and FIG. 10B shows the powder X-ray diffraction pattern of anthraquinone added here.

In addition, Table 1 shows an excerpt of TG data on the resultant mixture. As shown in the excerpt, an increase in weight reduction amount is observed in the range of 180° C. to 280° C. showing a weight reduction caused by the evaporation of anthraquinone but no increase in weight reduction amount is observed at higher temperatures. Accordingly, it can be judged that the mixture is such a mere mixture that anthraquinone is not incorporated into the hydroxygallium phthalocyanine crystal. A mixing ratio "hydroxygallium phthalocyanine:anthraquinone" can be calculated to be about 4:6 from the TG data.

Comparative Example 1-7

0.25 Part of a hydroxygallium phthalocyanine crystal was obtained by the same treatment as that of Example 1-13 except that in Example 1-13, 2 parts of Exemplified Compound (2) were not added. The powder X-ray diffraction pattern of the resultant hydroxygallium phthalocyanine crystal was the same as FIG. 2A.

In addition, Table 1 shows an excerpt of TG data on the resultant crystal.

Comparative Example 1-8

Figure 11A:
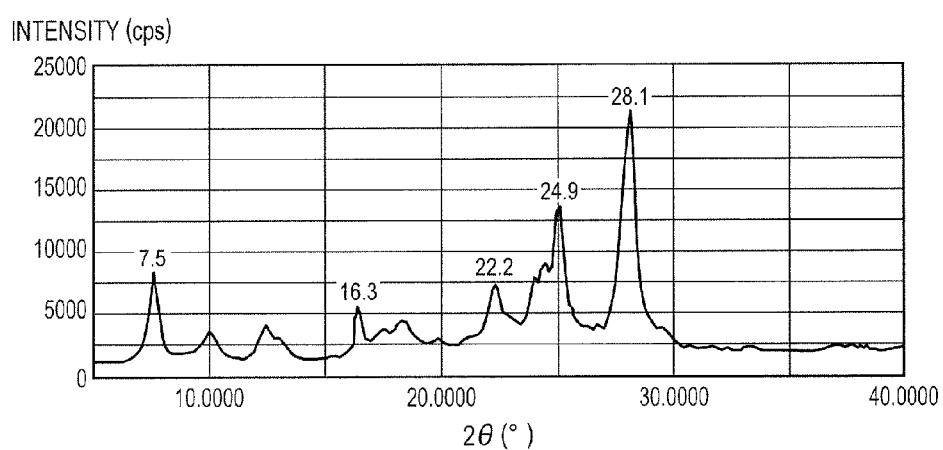
FIG. 11A is a powder X-ray diffraction pattern of a bromogallium phthalocyanine crystal obtained in Comparative Example 1-8.

0.3 Part of a bromogallium phthalocyanine crystal was obtained by the same treatment as that of Example 1-15 except that in Example 1-15, 2 parts of Exemplified Compound (2) were not added. FIG. 11A shows the powder X-ray diffraction pattern of the resultant crystal.

In addition, Table 1 shows an excerpt of TG data on the resultant crystal.

Comparative Example 1-9

Figure 11B:
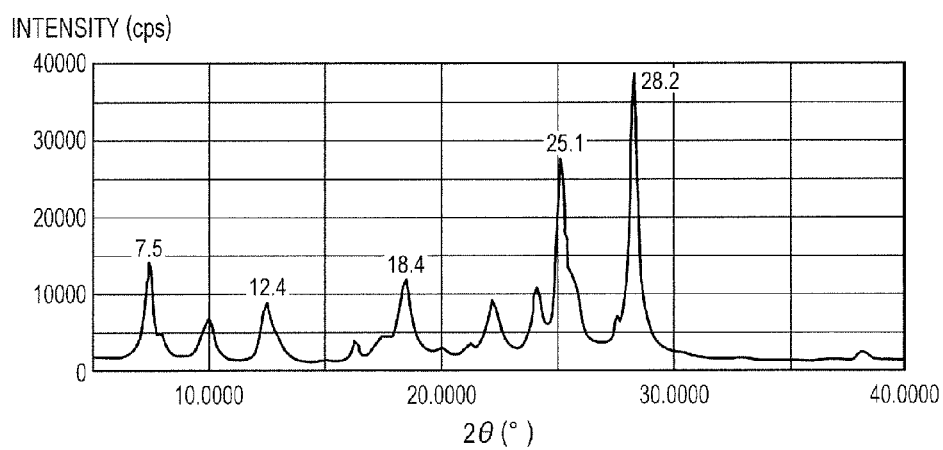
FIG. 11B is a powder X-ray diffraction pattern of an iodogallium phthalocyanine crystal obtained in Comparative Example 1-9.

0.2 Part of an iodogallium phthalocyanine crystal was obtained by the same treatment as that of Example 1-16 except that in Example 1-16, 1.0 part of Exemplified Compound (2) were not added. FIG. 11B shows the powder X-ray diffraction pattern of the resultant crystal.

In addition, Table 1 shows an excerpt of TG data on the resultant crystal.

Example 2-1

A solution formed of 60 parts of barium sulfate particles coated with tin oxide (trade name: Passtran PC1, manufactured by MITSUI MINING & SMELTING CO., LTD.), 15 parts of titanium oxide particles (trade name: TITANIX JR, manufactured by TAYCA CORPORATION), 43 parts of a resole-type phenol resin (trade name: Phenolite J-325, manufactured by DIC Corporation, solid content: 70 mass %), 0.015 part of a silicone oil (trade name: SH28PA, manufactured by Dow Corning Toray Co., Ltd.), 3.6 parts of a silicone resin (trade name: Tospearl 120, manufactured by Momentive Performance Materials Inc.), 50 parts of 2-methoxy-1-propanol, and 50 parts of methanol was subjected to a dispersion treatment in a ball mill for 20 hours. Thus, a coating liquid for an electro-conductive layer was prepared.

The coating liquid for an electro-conductive layer was applied onto an aluminum cylinder (having a diameter of 24 mm) as a support by immersion and then the resultant applied film was dried for 30 minutes at 140° C. Thus, an electro-conductive layer having a thickness of 15 μm was formed.

Next, 10 parts of a copolymer nylon resin (trade name: Amilan CM8000, manufactured by Toray Industries, Inc.) and 30 parts of a methoxymethylated 6-nylon resin (trade name: Toresin EF-30T, manufactured by Nagase ChemteX Corporation) were dissolved in a mixed solvent of 400 parts of methanol and 200 parts of n-butanol. Thus, a coating liquid for an undercoat layer was prepared.

The coating liquid for an undercoat layer was applied onto the electro-conductive layer by immersion and then the resultant applied film was dried. Thus, an undercoat layer having a thickness of 0.5 μm was formed.

Next, 10 parts of the hydroxygallium phthalocyanine crystal (charge-generating substance) obtained in Example 1-1, 5 parts of a polyvinyl butyral (trade name: S-LEC BX-1, manufactured by SEKISUI CHEMICAL CO., LTD.), and 250 parts of cyclohexanone were loaded into a sand mill using glass beads each having a diameter of 1 mm, and were then subjected to a dispersion treatment for 1 hour. The treated product was diluted with 250 parts of ethyl acetate. Thus, a coating liquid for a charge-generating layer was prepared.

The coating liquid for a charge-generating layer was applied onto the undercoat layer by immersion and then the resultant applied film was dried for 10 minutes at 100° C. Thus, a charge-generating layer having a thickness of 0.16 μm was formed.

Next, 8 parts of a compound (charge-transporting substance) represented by the following formula (3) and 10 parts of a polycarbonate (trade name: Iupilon Z-200, manufactured by MITSUBISHI GAS CHEMICAL COMPANY, INC.) were dissolved in 70 parts of monochlorobenzene. Thus, a coating liquid for a charge-transporting layer was prepared.

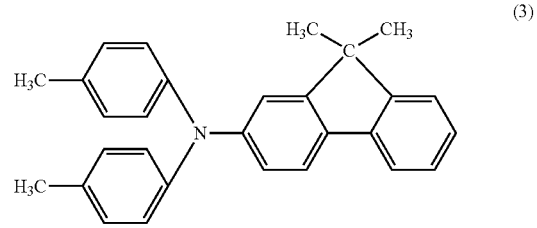 [SMILES: Cc1ccc(N(c2ccc(C)cc2)c2ccc3c(c2)C(C)(C)c2ccccc2-3)cc1]

The coating liquid for a charge-transporting layer was applied onto the charge-generating layer by immersion and then the resultant applied film was dried for 1 hour at 110° C. Thus, a charge-transporting layer having a thickness of 23 μm was formed.

Thus, a cylindrical (drum-shaped) electrophotographic photosensitive member of Example 2-1 was produced.

Example 2-2

An electrophotographic photosensitive member of Example 2-2 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-2.

Example 2-3

An electrophotographic photosensitive member of Example 2-3 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-3.

Example 2-4

An electrophotographic photosensitive member of Example 2-4 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-4.

Example 2-5

An electrophotographic photosensitive member of Example 2-5 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-5.

Example 2-6

An electrophotographic photosensitive member of Example 2-6 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-6.

Example 2-7

An electrophotographic photosensitive member of Example 2-7 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-7.

Example 2-8

An electrophotographic photosensitive member of Example 2-8 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-8.

Example 2-9

An electrophotographic photosensitive member of Example 2-9 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-9.

Example 2-10

An electrophotographic photosensitive member of Example 2-10 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-10.

Example 2-11

An electrophotographic photosensitive member of Example 2-11 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-11.

Example 2-12

An electrophotographic photosensitive member of Example 2-12 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-12.

Example 2-13

An electrophotographic photosensitive member of Example 2-13 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-13.

Example 2-14

An electrophotographic photosensitive member of Example 2-14 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-14.

Example 2-15

An electrophotographic photosensitive member of Example 2-15 was produced in the same manner as in Example 2-1 except that in Example 2-1, the hydroxygallium phthalocyanine crystal used in the preparation of the coating liquid for a charge-generating layer was changed to the bromogallium phthalocyanine crystal obtained in Example 1-15.

Example 2-16

An electrophotographic photosensitive member of Example 2-16 was produced in the same manner as in Example 2-1 except that in Example 2-1, the hydroxygallium phthalocyanine crystal used in the preparation of the coating liquid for a charge-generating layer was changed to the iodogallium phthalocyanine crystal obtained in Example 1-16.

Example 2-17

An electrophotographic photosensitive member of Example 2-17 was produced in the same manner as in Example 2-1 except that in Example 2-1, the hydroxygallium phthalocyanine crystal used in the preparation of the coating liquid for a charge-generating layer was changed to the iodogallium phthalocyanine crystal obtained in Example 1-17.

Example 2-18

An electrophotographic photosensitive member of Example 2-18 was produced in the same manner as in Example 2-1 except that in Example 2-1, the hydroxygallium phthalocyanine crystal used in the preparation of the coating liquid for a charge-generating layer was changed to the iodogallium phthalocyanine crystal obtained in Example 1-18.

Example 2-19

An electro-conductive layer, an undercoat layer, and a charge-generating layer were formed on a support in the same manner as in Example 2-2. Next, 10 parts of a compound (charge-transporting substance) represented by the following formula (4) and 10 parts of a polycarbonate (trade name: Iupilon Z-400, manufactured by MITSUBISHI GAS CHEMICAL COMPANY, INC.) were dissolved in 100 parts of monochlorobenzene. Thus, a coating liquid for a charge-transporting layer was prepared.

The coating liquid for a charge-transporting layer was applied onto the charge-generating layer by immersion and then the resultant applied film was dried for 30 minutes at 150° C. Thus, a charge-transporting layer having a thickness of 15 μm was formed.

Thus, an electrophotographic photosensitive member of Example 2-19 was produced.

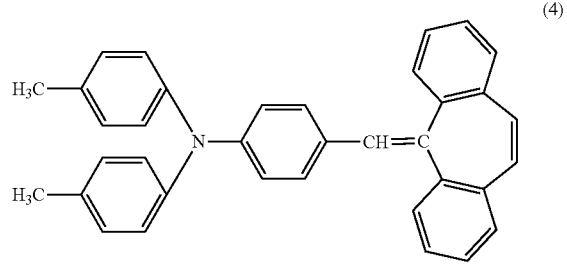 [SMILES: Cc1ccc(N(c2ccc(C)cc2)c2ccc(C=C3c4ccccc4C=Cc4ccccc43)cc2)cc1]

(4)

Comparative Example 2-1

An electrophotographic photosensitive member of Comparative Example 2-1 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-1.

Comparative Example 2-2

An electrophotographic photosensitive member of Comparative Example 2-2 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-2.

Comparative Example 2-3

An electrophotographic photosensitive member of Comparative Example 2-3 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-3.

Comparative Example 2-4

An electrophotographic photosensitive member of Comparative Example 2-4 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-4.

Comparative Example 2-5

An electrophotographic photosensitive member of Comparative Example 2-5 was produced in the same manner as in Example 2-1 except that in Example 2-1, the hydroxygallium phthalocyanine crystal used in the preparation of the coating liquid for a charge-generating layer was changed to the mixture obtained in Comparative Example 1-5.

Comparative Example 2-6

An electrophotographic photosensitive member of Comparative Example 2-6 was produced in the same manner as in Example 2-1 except that in Example 2-1, the hydroxygallium phthalocyanine crystal used in the preparation of the coating liquid for a charge-generating layer was changed to the mixture obtained in Comparative Example 1-6.

Comparative Example 2-7

An electrophotographic photosensitive member of Comparative Example 2-7 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-7.

Comparative Example 2-8

An electrophotographic photosensitive member of Comparative Example 2-8 was produced in the same manner as in Example 2-1 except that in Example 2-1, the hydroxygallium phthalocyanine crystal used in the preparation of the coating liquid for a charge-generating layer was changed to the bromogallium phthalocyanine crystal obtained in Comparative Example 1-8.

Comparative Example 2-9

An electrophotographic photosensitive member of Comparative Example 2-9 was produced in the same manner as in Example 2-1 except that in Example 2-1, the hydroxygallium phthalocyanine crystal used in the preparation of the coating liquid for a charge-generating layer was changed to the iodogallium phthalocyanine crystal obtained in Comparative Example 1-9.

Comparative Example 2-10

An electrophotographic photosensitive member of Comparative Example 2-10 was produced in the same manner as in Comparative Example 2-1 except that in Comparative Example 2-1, 10 parts of the hydroxygallium phthalocyanine crystal (the hydroxygallium phthalocyanine crystal obtained in Comparative Example 1-1) used in the preparation of the coating liquid for a charge-generating layer were changed to 10 parts of the hydroxygallium phthalocyanine crystal obtained in Comparative Example 1-1 and 1 part of Exemplified Compound (2).

Evaluations of Examples 2-1 to 2-19 and Comparative Examples 2-1 to 2-10

The electrophotographic photosensitive members of Examples 2-1 to 2-19 and Comparative Examples 2-1 to 2-10 were subjected to a ghost image evaluation.

Used as an electrophotographic apparatus for the evaluation was a laser beam printer manufactured by Hewlett-Packard Japan, Ltd. (trade name: Color Laser Jet CP3525dn) reconstructed as described below. That is, the printer was reconstructed so as to operate while pre-exposure was not turned on, and a charging condition and an image exposure value were variable. In addition, the printer was reconstructed so as to operate when the produced electrophotographic photosensitive members was mounted on a process cartridge for a cyan color and the cartridge was attached to a station for the cyan process cartridge, and a process cartridge for any other color was not mounted on the main body of the printer.

Upon output of an image, only the process cartridge for a cyan color was attached to the main body and a monochromatic image formed with a cyan toner alone was output.

First, under a normal-temperature, normal-humidity environment having a temperature of 23° C. and a relative humidity of 55% RH, the charging condition and the image exposure value were adjusted so that a dark portion potential and a light portion potential at an initial stage were −500 V and −100 V, respectively. The surface potential of the drum-shaped electrophotographic photosensitive member upon setting of an electric potential was measured as described below. The cartridge was reconstructed, a potential probe (trade name: model 6000B-8, manufactured by TREK JAPAN) was mounted at a development position, and an electric potential at the central portion of the cylindrical electrophotographic photosensitive member was measured with a surface potentiometer (trade name: model 344, manufactured by TREK JAPAN).

After that, the ghost image evaluation was performed under the same conditions. After that, a 1,000-sheet-passing durability test was performed, and the ghost image evaluation was performed immediately after the durability test and 15 hours after the durability test. Table 2 shows the results of the evaluation under the normal-temperature, normal-humidity environment.

Next, the electrophotographic photosensitive member was left to stand under a low-temperature, low-humidity environment having a temperature of 15° C. and a relative humidity of 10% RH for 3 days together with the electrophotographic apparatus for the evaluation. After that, the ghost image evaluation was performed. Then, the 1,000-sheet-passing durability test was performed under the same condition, and the ghost image evaluation was performed immediately after the durability test and 15 hours after the durability test. Table 2 shows the results of the evaluation under the low-temperature, low-humidity environment together.

It should be noted that the sheet-passing durability test was performed under such a condition that an E-letter image was printed on A4-size plain paper at a print percentage of 1% with a cyan color alone.

In addition, a method for the ghost image evaluation is as described below.

The ghost image evaluation was performed with a total of eight ghost images output in the following order. A solid white image was output on the first sheet. After that, four kinds of ghost charts were each output on one sheet, i.e., were output on a total of four sheets. Next, a solid black image was output on one sheet. After that, the four kinds of ghost charts were each output on one sheet, i.e., were output on a total of four sheets again. The ghost charts to be classified into ranks were as described below. Four solid black squares 25 mm on a side were arranged at an equal interval and parallel to one another in a solid white background ranging from a print image starting position (10 mm from the upper end of paper) to a distance of 30 mm, and in a range distant from the print image starting position by more than 30 mm, four kinds of halftone print patterns were output.

The four kinds of ghost charts are charts different from one another only in halftone pattern in the range distant from the print image starting position by more than 30 mm, and the halftone patterns are the following four kinds:

(1) a print (laser exposure) pattern in which one dot is laterally* printed every other space;

(2) a print (laser exposure) pattern in which two dots are laterally* printed every two spaces;

(3) a print (laser exposure) pattern in which two dots are laterally* printed every three spaces; and (4) a print (laser exposure) pattern of a knight pattern (a pattern in which two dots are printed on six squares like the movement of a knight in Japanese chess).

*: The term "laterally" refers to the scanning direction of a laser scanner (the horizontal direction in output paper).

The ghost images were classified into ranks as described below. It should be noted that it was judged that the effect of the present invention was not sufficiently obtained at each of the ranks 4, 5, and 6.

Rank 1: No ghost is observed in each ghost chart.

Rank 2: A ghost is slightly observed in a specific ghost chart.

Rank 3: A ghost is slightly observed in each ghost chart.

Rank 4: A ghost is observed in a specific ghost chart.

Rank 5: A ghost is observed in each ghost chart.

Rank 6: A ghost is clearly observed in a specific ghost chart.

TABLE 1

Results of TG measurement

| | Remaining mass % at each temperature | | | | | | |
|---|---|---|---|---|---|---|---|
| | 40° C. | 100° C. | 200° C. | 360° C. | 450° C. | 500° C. | 560° C. |
| Example 1-1 | 100.1% | 100.0% | 99.6% | 96.8% | 96.1% | 94.1% | 75.0% |
| Example 1-2 | 100.0% | 100.0% | 99.5% | 97.0% | 96.1% | 94.1% | 70.9% |
| Example 1-3 | 100.0% | 99.9% | 99.3% | 96.9% | 95.9% | 94.6% | 81.4% |
| Example 1-4 | 99.9% | 99.8% | 99.3% | 96.9% | 94.6% | 91.5% | 61.6% |
| Example 1-5 | 99.7% | 99.6% | 99.0% | 96.8% | 94.9% | 92.4% | 69.1% |
| Example 1-6 | 100.1% | 99.9% | 99.2% | 96.9% | 95.3% | 93.3% | 78.5% |
| Example 1-7 | 100.0% | 99.8% | 99.3% | 97.2% | 96.3% | 93.8% | 72.7% |
| Example 1-8 | 99.9% | 99.8% | 99.3% | 95.8% | 95.5% | 94.7% | 89.7% |
| Example 1-9 | 100.1% | 100.0% | 99.4% | 94.9% | 88.2% | 78.4% | 61.1% |
| Example 1-10 | 100% | 100.0% | 99.6% | 95.3% | 95.1% | 93.8% | 89.2% |
| Example 1-11 | 99.9% | 99.9% | 99.5% | 96.2% | 96.0% | 94.6% | 90.6% |
| Example 1-12 | 100.2% | 100.1% | 99.6% | 96.3% | 96.0% | 94.5% | 89.0% |
| Example 1-13 | 100.1% | 99.8% | 99.2% | 97.6% | 96.0% | 93.2% | 70.9% |
| Example 1-14 | 100.1% | 99.7% | 99.0% | 97.4% | 95.9% | 92.8% | 68.3% |
| Example 1-15 | 100.2% | 100.1% | 99.8% | 97.7% | 97.2% | 95.1% | 74.9% |
| Example 1-16 | 100.1% | 100.0% | 99.9% | 99.0% | 98.6% | 96.8% | 80.9% |
| Example 1-17 | 100.3% | 100.2% | 100.0% | 99.3% | 98.7% | 95.4% | 64.5% |
| Example 1-18 | 100.5% | 101.0% | 101.2% | 100.5% | 99.8% | 95.8% | 60.0% |
| Comparative Example 1-1 | 100.1% | 100.0% | 99.7% | 96.8% | 96.6% | 95.7% | 92.7% |
| Comparative Example 1-2 | 100.1% | 100.0% | 99.4% | 95.9% | 95.7% | 94.5% | 90.2% |
| Comparative Example 1-3 | 100.3% | 100.2% | 99.3% | 95.2% | 94.8% | 93.4% | 86.9% |
| Comparative Example 1-4 | 100.2% | 99.6% | 97.0% | 93.5% | 93.0% | 91.4% | 86.5% |
| Comparative Example 1-5 | 100.0% | 100.0% | 99.9% | 40.2% | 39.7% | 38.2% | 36.9% |
| Comparative Example 1-6 | 100.0% | 100.0% | 97.3% | 38.7% | 38.6% | 37.2% | 36.9% |
| Comparative Example 1-7 | 100.2% | 100.0% | 99.4% | 97.2% | 96.9% | 95.6% | 90.5% |
| Comparative Example 1-8 | 99.8% | 99.2% | 98.7% | 95.0% | 93.8% | 91.1% | 79.7% |
| Comparative Example 1-9 | 100.3% | 99.9% | 99.2% | 95.7% | 94.4% | 89.4% | 74.8% |
| Exemplified Compound (1) | 100.0% | 99.9% | 99.1% | 0.0% | 0.0% | 0.0% | 0.0% |
| Exemplified Compound (2) | 100.1% | 99.5% | 97.8% | 10.0% | 7.4% | 7.0% | 6.5% |
| Exemplified Compound (3) | 100.2% | 100.5% | 100.5% | 56.1% | 5.2% | 3.0% | 1.5% |
| Exemplified Compound (4) | 100.1% | 100.1% | 99.8% | 16.4% | 4.7% | 3.5% | 2.0% |
| Exemplified Compound (24) | 100.0% | 100.0% | 100.0% | 97.5% | 22.3% | 2.0% | 1.5% |

TABLE 2

Results of ghost image evaluation

| | Under normal-temperature, normal-humidity environment | | | Under low-temperature, low-humidity environment | | |
|---|---|---|---|---|---|---|
| | Initial stage Ghost rank | Immediately after durability test Ghost rank | 15 Hours after durability test Ghost rank | Initial stage Ghost rank | Immediately after durability test Ghost rank | 15 Hours after durability test Ghost rank |
| Example 2-1 | 2 | 2 | 2 | 2 | 3 | 3 |
| Example 2-2 | 2 | 2 | 2 | 2 | 2 | 2 |
| Example 2-3 | 1 | 1 | 1 | 1 | 2 | 2 |
| Example 2-4 | 1 | 2 | 1 | 1 | 2 | 2 |
| Example 2-5 | 1 | 2 | 1 | 1 | 2 | 2 |
| Example 2-6 | 1 | 2 | 2 | 2 | 3 | 2 |
| Example 2-7 | 2 | 2 | 2 | 2 | 3 | 3 |
| Example 2-8 | 2 | 3 | 2 | 2 | 3 | 3 |
| Example 2-9 | 2 | 3 | 2 | 2 | 3 | 2 |
| Example 2-10 | 2 | 3 | 2 | 2 | 3 | 3 |
| Example 2-11 | 2 | 3 | 3 | 2 | 3 | 3 |

TABLE 2-continued

Results of ghost image evaluation

| | Under normal-temperature, normal-humidity environment | | | Under low-temperature, low-humidity environment | | |
|---|---|---|---|---|---|---|
| | Initial stage Ghost rank | Immediately after durability test Ghost rank | 15 Hours after durability test Ghost rank | Initial stage Ghost rank | Immediately after durability test Ghost rank | 15 Hours after durability test Ghost rank |
| Example 2-12 | 2 | 2 | 1 | 1 | 2 | 2 |
| Example 2-13 | 1 | 2 | 1 | 1 | 2 | 2 |
| Example 2-14 | 1 | 2 | 2 | 2 | 3 | 2 |
| Example 2-15 | 2 | 2 | 2 | 2 | 3 | 2 |
| Example 2-16 | 2 | 2 | 2 | 2 | 3 | 3 |
| Example 2-17 | 2 | 2 | 2 | 2 | 2 | 2 |
| Example 2-18 | 1 | 2 | 2 | 2 | 2 | 2 |
| Example 2-19 | 2 | 3 | 2 | 2 | 3 | 2 |
| Comparative Example 2-1 | 4 | 5 | 4 | 5 | 6 | 5 |
| Comparative Example 2-2 | 3 | 4 | 4 | 4 | 5 | 5 |
| Comparative Example 2-3 | 5 | 6 | 5 | 6 | 6 | 6 |
| Comparative Example 2-4 | 3 | 4 | 4 | 4 | 5 | 4 |
| Comparative Example 2-5 | Unable to evaluate owing to excessively poor sensitivity | | | | | |
| Comparative Example 2-6 | Unable to evaluate owing to excessively poor sensitivity | | | | | |
| Comparative Example 2-7 | 5 | 6 | 6 | 6 | 6 | 6 |
| Comparative Example 2-8 | 4 | 5 | 5 | 5 | 6 | 6 |
| Comparative Example 2-9 | 4 | 5 | 5 | 5 | 6 | 6 |
| Comparative Example 2-10 | 2 | 3 | 3 | 2 | 3 | 3 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2011-262020, filed Nov. 30, 2011, and Japanese Patent Application No. 2012-244468, filed Nov. 6, 2012, which are hereby incorporated by reference herein in their entirety.

The invention claimed is:

1. An electrophotographic photosensitive member, comprising:
   a support; and
   a photosensitive layer formed on the support,
   wherein the photosensitive layer comprises a gallium phthalocyanine crystal in which an amine compound represented by the following formula (1) is contained:

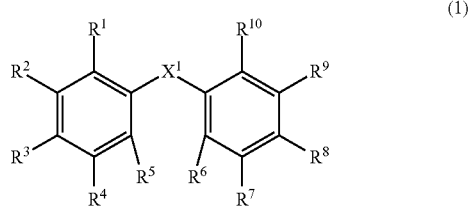

(1)

in the formula (1):
$R^1$ to $R^{10}$ each independently represent one of a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, and a substituted or unsubstituted cyclic amino group, provided that at least one of $R^1$ to $R^{10}$ represents one of an amino group substituted with a substituted or unsubstituted aryl group, an amino group substituted with a substituted or unsubstituted alkyl group, and a substituted or unsubstituted cyclic amino group; and
$X^1$ represents one of a carbonyl group and a dicarbonyl group, and wherein the amine compound comprises an amine compound represented by the following formula (2):

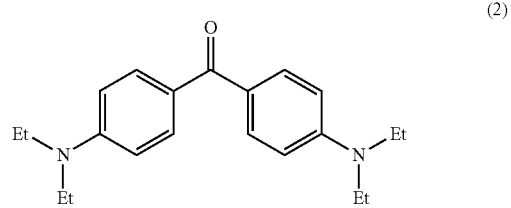

(2)

in the formula (2), Et represents an ethyl group.

2. An electrophotographic photosensitive member, comprising:

a support; and a photosensitive layer formed on the support, wherein the photosensitive layer comprises a gallium phthalocyanine crystal in which an amine compound represented by the following formula (1) is contained:

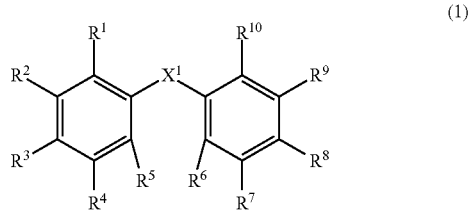

in the formula (1):

R¹ to R¹⁰ each independently represent one of a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, and a substituted or unsubstituted cyclic amino group, provided that at least one of R¹ to R¹⁰ represents one of an amino group substituted with a substituted or unsubstituted aryl group, an amino group substituted with a substituted or unsubstituted alkyl group, and a substituted or unsubstituted cyclic amino group; and X¹ represents one of a carbonyl group and a dicarbonyl group, and wherein the substituted or unsubstituted cyclic amino group comprises one of a morpholino group and a 1-piperidino group.

3. An electrophotographic photosensitive member, comprising:

a support; and a photosensitive layer formed on the support, wherein the photosensitive layer comprises a gallium phthalocyanine crystal in which an amine compound represented by the following formula (1) is contained:

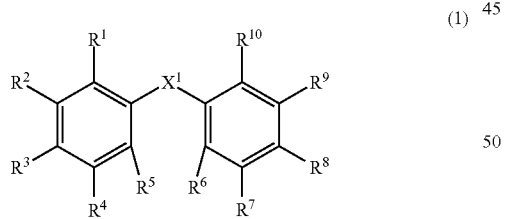

in the formula (1):

R¹ to R¹⁰ each independently represent one of a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, and a substituted or unsubstituted cyclic amino group, provided that at least one of R¹ to R¹⁰ represents one of an amino group substituted with a substituted or unsubstituted aryl group, an amino group substituted with a substituted or unsubstituted alkyl group, and a substituted or unsubstituted cyclic amino group; and X¹ represents one of a carbonyl group and a dicarbonyl group, and wherein the gallium phthalocyanine crystal comprises a hydroxygallium phthalocyanine crystal having peaks at Bragg angles 2θ±0.2° of 7.4°, 27.4°, and 28.3° in CuKα X-ray diffraction.

4. The electrophotographic photosensitive member according to claim 3, wherein a peak intensity at 27.4° of the hydroxygallium phthalocyanine crystal having peaks at Bragg angles 2θ±0.2° of 7.4°, 27.4°, and 28.3° in CuKα X-ray diffraction is 5% or more and 100% or less with respect to a peak intensity at 7.4° thereof.

5. An electrophotographic photosensitive member, comprising:

a support; and a photosensitive layer formed on the support, wherein the photosensitive layer comprises a gallium phthalocyanine crystal in which an amine compound represented by the following formula (1) is contained:

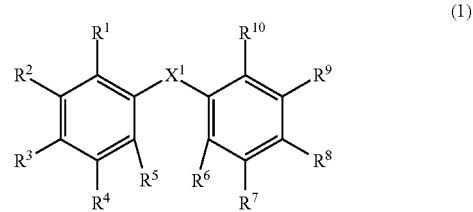

in the formula (1):

R¹ to R¹⁰ each independently represent one of a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, and a substituted or unsubstituted cyclic amino group, provided that at least one of R¹ to R¹⁰ represents one of an amino group substituted with a substituted or unsubstituted aryl group, an amino group substituted with a substituted or unsubstituted alkyl group, and a substituted or unsubstituted cyclic amino group; and X¹ represents one of a carbonyl group and a dicarbonyl group, and wherein the gallium phthalocyanine crystal comprises a hydroxygallium phthalocyanine crystal having peaks at Bragg angles 2θ±0.2° of 7.4°, 16.6°, 21.8°, 25.5°, 27.0°, and 28.3° in CuKα X-ray diffraction.

6. A gallium phthalocyanine crystal in which an amine compound represented by the following formula (1) is contained:

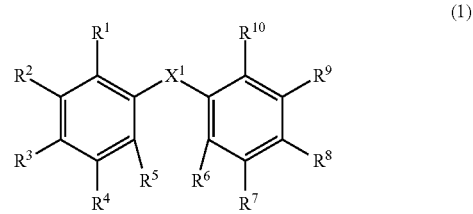

in the formula (1):

R¹ to R¹⁰ each independently represent one of a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, and a substituted or unsubstituted cyclic amino group, provided that at least one of $R^1$ to $R^{10}$ represents one of an amino group substituted with a substituted or unsubstituted aryl group, an amino group substituted with a substituted or unsubstituted alkyl group, and a substituted or unsubstituted cyclic amino group; and $X^1$ represents one of a carbonyl group and a dicarbonyl group, wherein the gallium phthalocyanine crystal comprises a hydroxygallium phthalocyanine crystal having peaks at Bragg angles 2θ±0.2° of 7.4°, 27.4°, and 28.3° in CuKα X-ray diffraction.

7. A hydroxygallium phthalocyanine crystal, comprising peaks at Bragg angles 2θ±0.2° of 7.4°, 27.4°, and 28.3° in CuKα X-ray diffraction.

8. The hydroxygallium phthalocyanine crystal according to claim 7, wherein a peak intensity at 27.4° of the gallium phthalocyanine crystal having peaks at Bragg angles 2θ±0.2° of 7.4°, 27.4°, and 28.3° in CuKα X-ray diffraction is 5% or more and 100% or less with respect to a peak intensity at 7.4° thereof.

9. A hydroxygallium phthalocyanine crystal, comprising peaks at Bragg angles 2θ±0.2° of 7.4°, 16.6°, 21.8°, 25.5°, 27.0°, and 28.3° in CuKα X-ray diffraction.

* * * * *